United States Patent
Suzuki et al.

(10) Patent No.: US 10,527,369 B2
(45) Date of Patent: Jan. 7, 2020

(54) HEAT EXCHANGER ELEMENT, MANUFACTURING METHOD THEREFOR, AND HEAT EXCHANGER

(71) Applicant: NGK INSULATORS, LTD., Nagoya (JP)

(72) Inventors: Yoshio Suzuki, Nagoya (JP); Hironori Takahashi, Nagoya (JP); Tatsuo Kawaguchi, Nagoya (JP); Yoshimasa Kondo, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1001 days.

(21) Appl. No.: 14/095,279

(22) Filed: Dec. 3, 2013

(65) Prior Publication Data
US 2014/0090821 A1    Apr. 3, 2014

Related U.S. Application Data

(63) Continuation of application No. PCT/JP2012/064814, filed on Jun. 8, 2012.

(30) Foreign Application Priority Data

Jun. 10, 2011   (JP) .................................. 2011-129677
Feb. 9, 2012    (JP) .................................. 2012-025750

(51) Int. Cl.
*F28F 21/08*   (2006.01)
*F28F 21/04*   (2006.01)
(Continued)

(52) U.S. Cl.
CPC ............ *F28F 21/081* (2013.01); *B23P 15/26* (2013.01); *F28F 7/02* (2013.01); *F28F 21/04* (2013.01);
(Continued)

(58) Field of Classification Search
CPC . F28D 7/10; F28D 7/106; F28D 7/163; F28D 17/00; F28D 17/04; F28F 1/40;
(Continued)

(56) References Cited

U.S. PATENT DOCUMENTS 4,118,199 A * 10/1978 Volker ................. B01D 53/944
                                                422/171
4,416,676 A * 11/1983 Montierth ............. B01D 25/26
                                                210/510.1
(Continued)

FOREIGN PATENT DOCUMENTS

EP    2 246 539 A2    11/2010
JP    61-024997 A1     2/1986
(Continued)

OTHER PUBLICATIONS

JP2001046885 Machine Translation.*
(Continued)

*Primary Examiner* — Keith M Raymond
*Assistant Examiner* — Gustavo A Hincapie Serna
(74) *Attorney, Agent, or Firm* — Burr & Brown, PLLC

(57) ABSTRACT

A heat exchanger element includes at least two honeycomb structures arranged serially and each including a cell structural portion having cells separated and formed by partition walls containing SiC and functioning as passages which extend from one end face to the other end face and which a first fluid passes through, and an outer peripheral wall disposed on the outer periphery of the cell structural portion. The first fluid passes through the cells of the honeycomb structures without leaking out of the cells or mixing. The cell structural portions of at least a pair of the honeycomb structures adjacent to each other among the honeycomb
(Continued)

structures arranged serially are disposed with a gap, and the first fluid passing through the cells mixes together between end faces forming the gap.

16 Claims, 14 Drawing Sheets

(51) Int. Cl.
*F28F 7/02* (2006.01)
*B23P 15/26* (2006.01)

(52) U.S. Cl.
CPC ....... *F28F 2275/14* (2013.01); *Y10T 29/4935* (2015.01)

(58) Field of Classification Search
CPC .......... F28F 13/12; F28F 13/125; F28F 13/08; F28F 1/42; F28F 21/04; B01J 35/04; B01J 23/02; F23C 13/00; F23C 13/04; B01D 46/00; B01D 50/00; B01D 53/00; B01D 53/86; F01N 3/28
USPC ...... 165/109.1, 146, 154, 166, 167, 168, 67, 165/68, 164, 165, 4, 10; 428/116, 98, 428/117, 118; 55/523
See application file for complete search history.

(56) References Cited

U.S. PATENT DOCUMENTS

| | | | | |
|---|---|---|---|---|
| 4,550,005 | A * | 10/1985 | Kato | B28B 3/269 264/177.12 |
| 4,787,443 | A | 11/1988 | Fukatsu et al. | |
| 5,387,399 | A | 2/1995 | Nishida et al. | |
| 5,569,455 | A * | 10/1996 | Fukui | B01D 53/945 422/174 |
| 5,729,902 | A * | 3/1998 | Wieres | B01J 35/04 29/890 |
| 6,057,025 | A * | 5/2000 | Kalman | B32B 3/12 264/177.12 |
| 6,386,862 | B1 * | 5/2002 | Fujita | F23C 13/00 431/170 |
| 6,696,131 | B1 * | 2/2004 | Nishimura | B01J 35/04 422/180 |
| 6,773,580 | B2 | 8/2004 | Boger | B01J 19/2485 208/134 |
| 7,488,412 | B2 * | 2/2009 | Abe | B01D 46/0024 208/179 |
| 7,685,714 | B2 * | 3/2010 | Tursky | B01D 53/9454 29/890 |
| 7,943,808 | B2 * | 5/2011 | Hershkowitz | B01F 3/02 422/138 |
| 8,241,725 | B2 * | 8/2012 | Hiramatsu | C04B 28/24 422/180 |
| 8,507,404 | B2 * | 8/2013 | El-Malki | B01D 53/9404 502/20 |
| 2002/0096225 | A1 * | 7/2002 | Ishizu | B21D 22/14 138/114 |
| 2007/0261557 | A1 | 11/2007 | Gadkaree et al. | |
| 2009/0041635 | A1 * | 2/2009 | Berkey | F01N 13/0093 422/177 |
| 2009/0057963 | A1 * | 3/2009 | Chan | C04B 35/64 264/630 |
| 2010/0192769 | A1 | 8/2010 | Gadkaree et al. | |

FOREIGN PATENT DOCUMENTS

| | | | | |
|---|---|---|---|---|
| JP | 61-083897 | A1 | 4/1986 | |
| JP | S61276689 | * | 12/1986 | ............... F28D 7/10 |
| JP | S61276689 | A * | 12/1986 | ............... F28D 7/10 |
| JP | 63-096489 | A1 | 4/1988 | |
| JP | S6396489 | A * | 4/1988 | ............. F28D 19/04 |
| JP | 63-060319 | B2 | 11/1988 | |
| JP | 02-150691 | A1 | 6/1990 | |
| JP | 03-094837 | A1 | 4/1991 | |
| JP | 03-164692 | A1 | 7/1991 | |
| JP | UH0587221 | * | 10/1991 | ............... F01N 3/28 |
| JP | 05-087221 | U | 11/1993 | |
| JP | UH0587221 | * | 11/1993 | ............... F01N 3/28 |
| JP | 05-340683 | A1 | 12/1993 | |
| JP | 07-004824 | U | 1/1995 | |
| JP | 07-286797 | A1 | 10/1995 | |
| JP | 09-257239 | A1 | 9/1997 | |
| JP | 09327627 | * | 12/1997 | ............. F23D 14/18 |
| JP | H09327627 | * | 12/1997 | ............... B01J 35/04 |
| JP | H09327627 | A * | 12/1997 | ............. F23D 14/18 |
| JP | 2001-046885 | A1 | 2/2001 | |
| JP | 2001046885 | * | 2/2001 | ............... B01J 35/04 |
| JP | 2002-276332 | * | 9/2002 | ............... F01N 3/02 |
| JP | 2002-276332 | A1 | 9/2002 | |
| JP | 2004-211548 | A1 | 7/2004 | |
| JP | 2009-536875 | A1 | 10/2009 | |

OTHER PUBLICATIONS

JP09327627—Machine Translation Document.*
Machine Translation JPH09327627A.*
Machine Translation JPUH0587221.*
JPS61276689 Machine Translation.*
JPUH0587221 Machine Translation.*
JPH09327627 Machine Translation.*
Machine Translation JPH09327627A (Year: 1997).*
Machine Translation JPUH0587221 (Year: 1993).*
Machine Translation JPS61276689A (Year: 1986).*
Machine Translation JPS6396489A (Year: 1988).*
Machine Translation JPUH0587221 (Year: 1991).*
Machine Translation JP2002-276332 (Year: 2002).*
Machine Translation JPS61276689 (Year: 1986).*
U.S. Appl. No. 14/140,918, filed Dec. 26, 2013, Kawaguchi et al.
Extended European Search Report (Application No. 12797403.8) dated Oct. 30, 2014.
Chinese Office Action (Application No. 201280027515.x) dated Mar. 18, 2015.
English translation of International Written Opinion (PCT/ISA/237) (Application No. PCT/JP2012/064814) dated Sep. 11, 2012.
U.S. Appl. No. 13/491,709, filed Jun. 8, 2012 Suzuki et al.
U.S. Appl. No. 14/036,379, filed Sep. 25, 2013, Suzuki et al.
U.S. Appl. No. 13/852,144, filed Mar. 28, 2013, Miyazaki et al.
U.S. Appl. No. 13/895,656, filed May 16, 2013, Yoshida et al.
International Search Report and Written Opinion dated Sep. 11, 2012.
European Office Action, European Application No. 12797403.8, dated Apr. 7, 2017 (3 pages).

* cited by examiner

HEAT EXCHANGER ELEMENT, MANUFACTURING METHOD THEREFOR, AND HEAT EXCHANGER

BACKGROUND OF THE INVENTION

1. Field of the Invention

The present invention relates to a heat exchanger element for transferring the heat of the first fluid (high temperature side) to the second fluid (low temperature side), a manufacturing method therefor, and a heat exchanger including the heat exchanger element.

2. Description of Related Art

For improving fuel consumption of an automobile, there have been demanded techniques of recovering heat from high temperature gas such as combustion exhaust gas of an engine or the like and effectively using it or cooling exhaust gas upon recirculating exhaust gas to the engine admission side. In addition, there has been demanded a gas/liquid heat exchanger for exchanging heat between high temperature gas such as exhaust gas and liquid such as cooling water. As a gas/liquid heat exchanger, fin-provided tube type heat exchangers of an automobile radiator and an air-conditioning outdoor unit are general. However, for exchanging heat with gas such as automobile exhaust gas, it is difficult to use a general metal heat exchanger at high temperature because of poor heat resistance. Therefore, heat resistant metal such as stainless steel and ceramic material having heat resistance, thermal shock resistance, and corrosion resistance are suitable. Though a heat exchanger made of heat resistant metal is known, heat resistant metal has problems of difficulty in machining, high density and high weight, and low heat conduction in addition to high price.

In the Patent Document 1, there is disclosed a ceramic heat exchange body where a heating body passage is disposed from one end face to the other end face of a ceramic main body and where a passage for a body to be heated is formed in the direction perpendicular to the heating body passage.

In the Patent Document 2, there is disclosed a ceramic heat exchanger where a plurality of ceramic heat exchange bodies each having a heating fluid passage and a non-heating fluid passage formed therein are disposed in a casing with using an unfired ceramic string-shaped seal material between the corresponding faces to be bonded of the heat exchange bodies.

However, since the Patent Documents 1 and 2 have poor productivity because of a large number of steps such as plugging and slit-forming, the costs are high. In addition, since the passages of gas/liquid are disposed in every other row, the piping structure and seal structure of the fluid become complex. Further, since a coefficient of heat conductivity of liquid is generally 10 to 100 times larger than gas, the heat transfer area on the gas side is insufficient in these techniques, and the heat exchanger becomes large in proportion to the heat transfer area of the gas which limits the heat exchanger performance.

Patent Documents 3 and 4 disclose heat exchangers where a honeycomb structural portion and a tube portion are separately produced and then bonded together. However, since these have poor productivity, the costs tend to be high.

On the other hand, Patent Document 5 discloses a heat accumulating body of a ceramic honeycomb structure.

PRIOR ART DOCUMENT

Patent Document

Patent Document 1: JP-A-61-24997 bulletin
Patent Document 2: JP-B-63-60319 bulletin
Patent Document 3: JP-A-61-83897 bulletin
Patent Document 4: JP-A-2-150691 bulletin
Patent Document 5: JP-A-9-257239 bulletin

SUMMARY OF THE INVENTION

Problem to be Solved by the Invention

As described above, the heat exchangers of Patent Documents 1 to 4 need high production costs because of complex structures. Therefore, there has been required a heat exchanger where the production costs are reduced by reducing the number of processing steps of a honeycomb structure.

On the other hand, Patent Document 5 discloses a heat accumulating body of a ceramic honeycomb structure. Though the production costs of this body is not high because the honeycomb structure does not require any special processing, it is necessary to add further ideas in order to use the body as a heat exchanger.

The present invention aims to provide a heat exchanger element using a honeycomb structure and having improved temperature efficiency, a manufacturing method therefor, and a heat exchanger including the heat exchanger element.

Means to Solve the Problems

In order to solve the aforementioned problems, according to the present invention, there are provided the following heat exchanger element, manufacturing method therefor, and heat exchanger including the heat exchanger element.

According to a first aspect of the present invention, a heat exchanger element comprising at least two honeycomb structures arranged serially and each including a cell structural portion having cells separated and formed by partition walls containing SiC and functioning as passages which extend from one end face to the other end face and which a first fluid passes through, and an outer peripheral wall disposed on the outer periphery of the cell structural portion is provided; wherein the first fluid passes through the cells of the honeycomb structures without leaking out of the cells or mixing, the cell structural portions of at least a pair of the honeycomb structures adjacent to each other among the honeycomb structures arranged serially are disposed with a gap, and the first fluid passing through the cells mixes together between end faces forming the gap, and the first fluid and a second fluid exchange heat via the outer peripheral walls of the honeycomb structures in a state where the first fluid passing through the cells and the second fluid passing outside the outer peripheral walls of the honeycomb structures are not mixed with each other.

According to a second aspect of the present invention, the heat exchanger element according to the first aspect is provided, wherein the gap between the cell structural portions of the adjacent honeycomb structures is 0.1 to 10 mm.

According to a third aspect of the present invention, the heat exchanger element according to the first or second aspects is provided, wherein at least one of the honeycomb structures connected serially is rotated with a central axis of the honeycomb structure as the center so that the directions of the partition walls of the cells are out of alignment with respect to the other honeycomb structure(s) to allow the first fluid passing through the cells to be mixed together between the end faces forming the gap.

According to a fourth aspect of the present invention, the heat exchanger element according to any one of the first to third aspects is provided, wherein a honeycomb structure has a different cell density from the other honeycomb structures among the honeycomb structures connected serially.

According to a fifth aspect of the present invention, the heat exchanger element according to any one of the first to fourth aspects is provided, wherein a honeycomb structure having a higher cell density than that of the honeycomb structure located closest to the inlet of the first fluid is disposed at the second or any subsequent position from the inlet side.

According to a sixth aspect of the present invention, the heat exchanger element according to any one of the first to fifth aspects is provided, wherein the thickness of the partition walls is different between the honeycomb structures on the inlet side and the outlet side of the first fluid.

According to a seventh aspect of the present invention, the heat exchanger element according to any one of the first to third aspects is provided, wherein the honeycomb structures connected serially have the same cell structure, and, with respect to the location of a cell intersection of one of the honeycomb structures, a cell intersection of at least another honeycomb structure is out of alignment.

According to an eighth aspect of the present invention, the heat exchanger element according to any one of the first to seventh aspects is provided, wherein the honeycomb structures have an extended outer peripheral wall formed cylindrically by extending from the end faces to the outside in the axial direction, and the honeycomb structures are arranged with the extended outer peripheral walls abutting each other to have a gap between the cell structural portions.

According to a ninth aspect of the present invention, the heat exchanger element according to any one of the first to seventh aspects is provided, comprising metal engagement honeycomb structures each including a metal pipe engaged with the outer peripheral face of the honeycomb structure, wherein the metal pipe has a connecting means arranged in at least one end portion and capable of connecting the end portion to another metal pipe, and the metal pipes are connected to one another with the connecting means to arrange the honeycomb structures serially with a gap.

According to a tenth aspect of the present invention, the heat exchanger element according to the ninth aspect is provided, wherein a diameter of one end portion of the metal pipe is larger than that of the end portion on the other side in the connecting means, and the metal pipes are connected to one another by inserting the end portion on the other side of another metal pipe into the one end portion for engagement.

According to an eleventh aspect of the present invention, the heat exchanger element according to the ninth aspect is provided, wherein a diameter of the one end portion of the metal pipe is larger than that of the end portion on the other side in the connecting means, and a convex portion protruding in the diametral direction is formed in one of the end portions whereas a concave portion depressed in the diametral direction is formed in the other end portion opposite to the end portion having the convex portion, so that the convex portion and the concave portion in another metal pipe engage with each other for connection.

According to a twelfth aspect of the present invention, the heat exchanger element according to the ninth aspect is provided, wherein a notched portion depressed in the axial direction is formed in each of the end portions as the connecting means, and an unnotched portion, which is not the notched portion, of another metal pipe is engaged with the notched portion for connection.

According to a thirteenth aspect of the present invention, the heat exchanger element according to any one of the ninth to twelfth aspects is provided, wherein a heat resistance reduction layer made of one of soft metals, alloy materials, and carbon-based materials is arranged between the honeycomb structure and the metal pipe.

According to a fourteenth aspect of the present invention, a method for manufacturing the heat exchanger element according to the thirteenth aspect is provided, wherein the metal pipe is engaged with the honeycomb structure by shrink fitting in a state of sandwiching the heat resistance reduction layer therebetween.

According to a fifteenth aspect of the present invention a heat exchanger comprising: the heat exchanger element according to any one of the first to thirteenth aspects is provided, and a casing containing the heat exchanger element therein; wherein the first fluid and the second fluid are allowed to exchange heat via the outer peripheral wall of the honeycomb structure in the state where the first fluid passing through the cells and the second fluid passing outside the outer peripheral wall of the honeycomb structure in the casing are not mixed with each other.

Effect of the Invention

The arrangement of a plurality of honeycomb structures serially with a gap between cell structural portions of the honeycomb structures facilitates heat transfer from the first fluid to the partition walls and the outer peripheral wall and improves temperature efficiency in comparison with the case having no gap.

DETAILED DESCRIPTION OF THE INVENTION

Figure 1A:
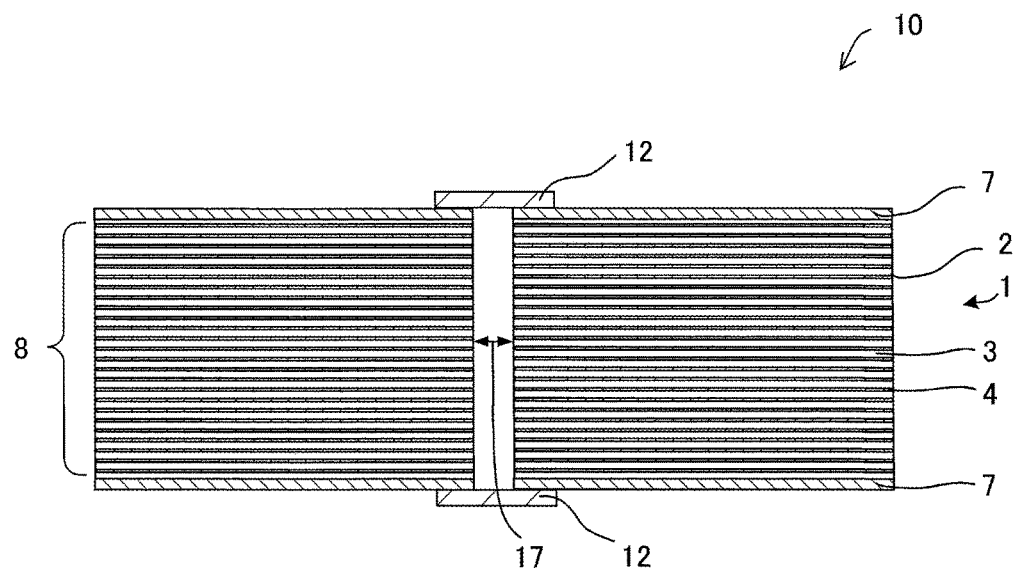
FIG. 1A is a cross-sectional schematic view showing an embodiment of a heat exchanger element where honeycomb structures are connected to each other with a metal pipe.

Hereinbelow, embodiments of the present invention will be described with referring to drawings. The present invention is not limited to the following embodiments, and changes, modifications, and improvements may be added as long as they do not deviate from the scope of the invention.

A heat exchanger element 10 of the present invention is a heat exchanger element where at least two honeycomb structures 1 each including a cell structural portion 8 having cells 3 separated and formed by partition walls 4 containing SiC and functioning as passages which extend from one end face 2 to the other end face 2 and which a first fluid passes through and an outer peripheral wall 7 disposed on the outer periphery of the cell structural portion 8 are arranged serially. The first fluid flows through each cell 3 of the honeycomb structure 1 without leaking out of the cell 3 and mixing. That is, the honeycomb structure 1 formed lest the first fluid flowing through a cell 3 should pass through a partition wall 4 and leak into another cell 3. In the heat exchanger element 10, the cell structural portions 8 of at least a pair of adjacent honeycomb structures 1 among the honeycomb structures 1 arranged serially are disposed with a gap 17 therebetween, and the first fluid flowing through each cell 3 is mixed between the end faces 2 forming the gap 17. Heat can be exchanged between the first fluid and the second fluid via the outer peripheral walls 7 of the honeycomb structures 1 in a state where the first fluid flowing through the cells 3 and the second fluid flowing outside the outer peripheral walls 7 of the honeycomb structures 1 are not mixed together.

Figure 1B:
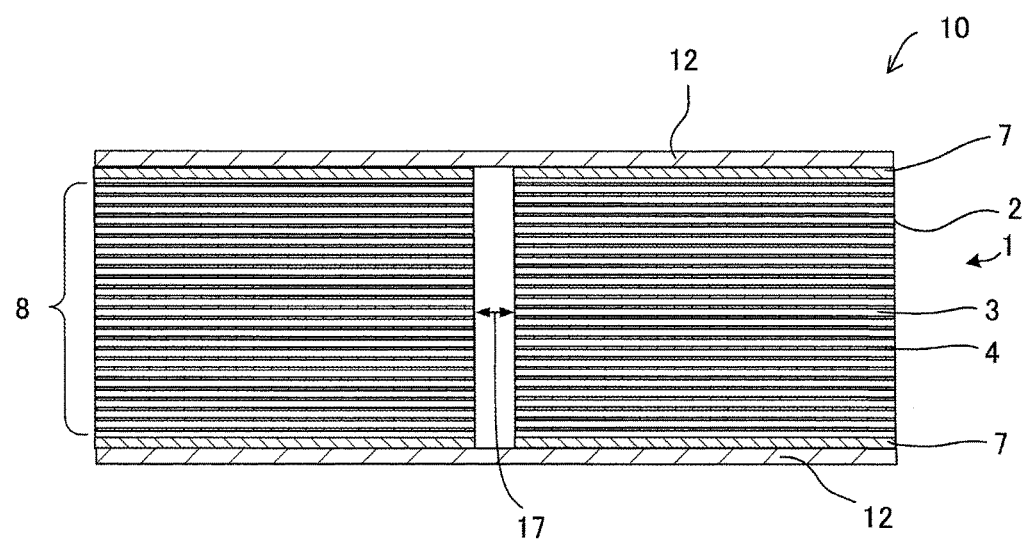
FIG. 1B is a cross-sectional schematic view showing an embodiment of a heat exchanger element where honeycomb structures are arranged in a metal pipe.

FIGS. 1A and 1B show cross-sectional views showing embodiments of the heat exchanger element 10. In the heat exchanger element 10 shown in FIG. 1A, end portions of two honeycomb structures 1 (see FIG. 4 regarding a perspective view of the honeycomb structure 1) are connected to each other with a metal pipe 12. A gap 17 is formed between the honeycomb structures 1. The arrangement of forming a gap 17 between the honeycomb structures 1, in other words, between the cell structural portions 8 enables the first fluid flowing through the cells 3 to be mixed in the gap 17, and the flow becomes turbulent. This facilitates heat transfer from the first fluid to the partition walls 4 and the outer peripheral walls 7 and improves the temperature efficiency. In the heat exchanger element 10 shown in FIG. 1B, two honeycomb structures 1 are arranged with a gap 17 therebetween inside a metal pipe 12.

The gap 17 is preferably 0.1 to 10 mm, more preferably 0.5 to 5 mm. The gap of 0.1 mm or more and 10 mm or less makes sufficient the heat transfer from the first fluid flowing through the cells 3 to the partition walls 4 and the outer peripheral walls 7. In addition, the temperature efficiency can be improved.

In the embodiments of FIGS. 1A and 1B, three or more honeycomb structures 1 may be connected together. In that case, it is preferable that at least a pair of honeycomb structures 1 are arranged with a gap 17 therebetween, and it is more preferable that all the honeycomb structures 1 are arranged to have a gap 17 between the honeycomb structure 1 and adjacent honeycomb structures 1. In the case where two or more gaps 17 are present, the gaps may be different mutually or the same.

Figure 2:
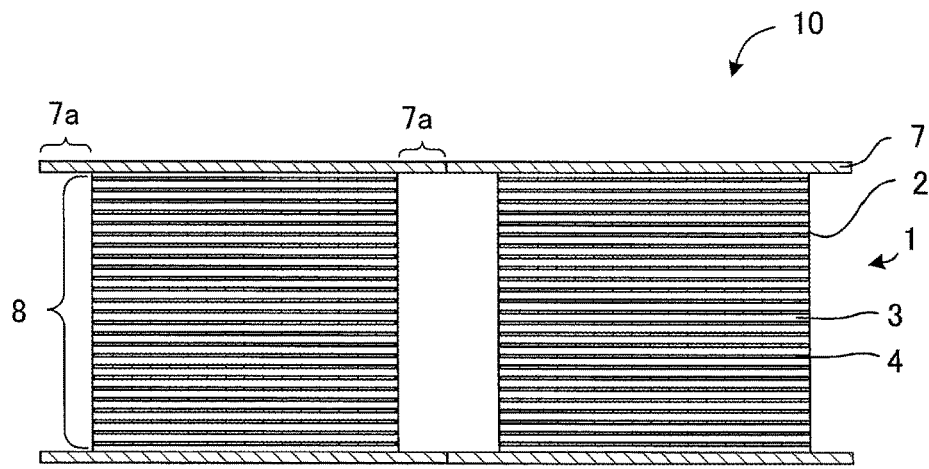
FIG. 2 is a cross-sectional schematic view showing an embodiment of a heat exchanger element formed by connecting honeycomb structures each having an extended outer peripheral wall.

FIG. 2 shows another embodiment of a heat exchanger element 10. The honeycomb structures 1 have extending outer peripheral walls 7a formed into a cylindrical shape and extending from the end faces 2 to the outside in the axial direction. The honeycomb structures 1 are arranged so that the extending outer peripheral walls 7a abut each other to have a gap 17 between the cell structures 8.

Figure 3A:
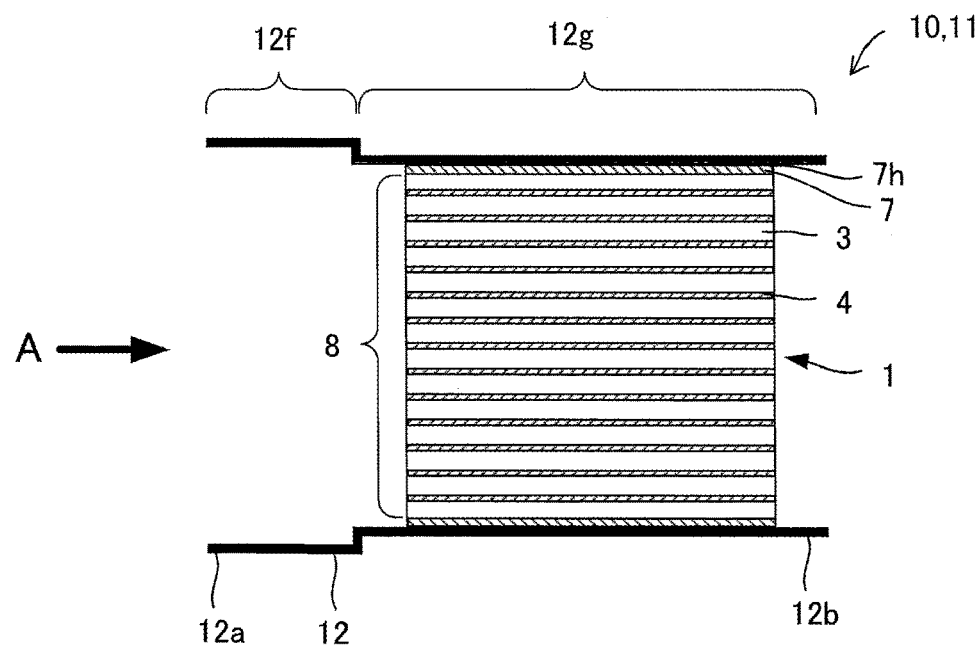
FIG. 3A is a cross-sectional view taken along a cross section parallel to the axial direction of a heat exchanger element constituted of a metal-engaging honeycomb structure.
Figure 3B:
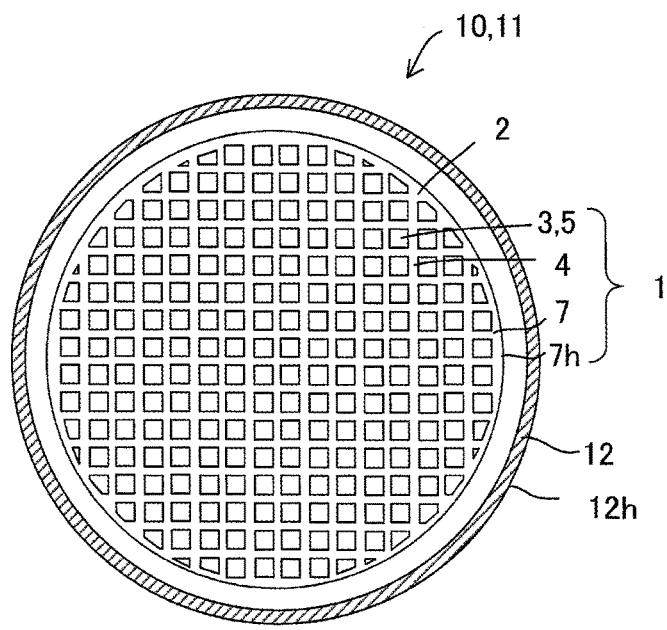
FIG. 3B is the A arrow view of FIG. 3A.

FIG. 3A shows a cross-sectional view taken along a cross section parallel to the axial direction of a heat exchanger element 10 of the present invention. FIG. 3B shows the A arrow view of FIG. 3A. It is a heat exchanger element 10 (single body) constituted of metal-engaging honeycomb structure 11 including a metal pipe 12 engaged with the outer peripheral face 7h of a honeycomb structure 1. The metal pipe 12 is provided with a connecting means capable of connecting the metal pipe 12 with another metal pipe 12 in at least one end portion. The connection of metal pipes 12 with a connecting means enables honeycomb structures 1 to be serially connected to one another and arranged with a gap 17 between honeycomb structures 1. The heat exchanger element 10 can exchange heat between the first fluid and the second fluid via the outer peripheral walls 7 and the metal pipes 12 of a honeycomb structure 1 in a state where the first fluid flowing through the cells 3 and the second fluid flowing outside the metal pipes 12 are not mixed with each other.

Figure 4:
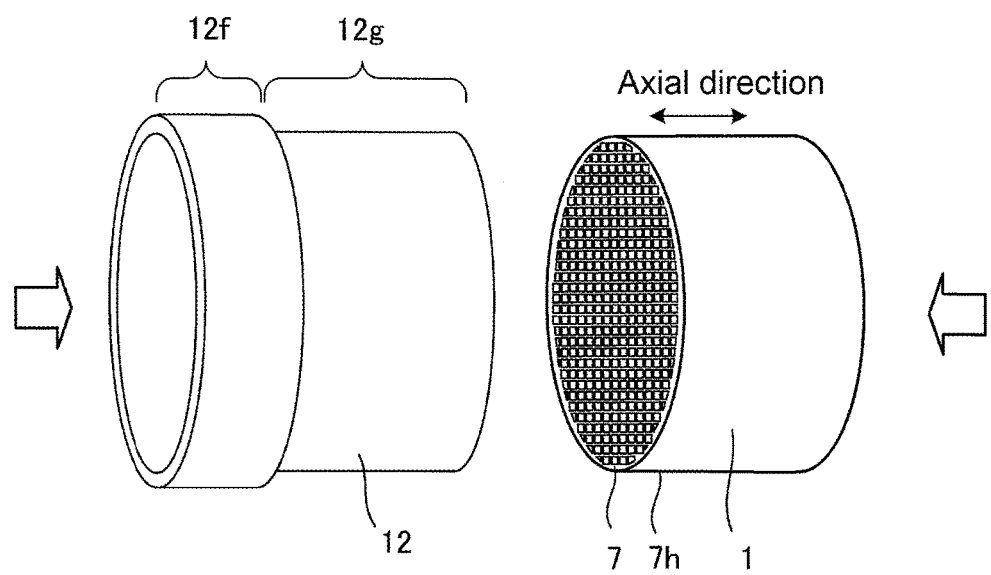
FIG. 4 is a schematic view showing a step for manufacturing a metal-engaging honeycomb structure by integrating a honeycomb structure and a metal pipe.

As one embodiment of the connecting means, as shown in FIGS. 3A and 4, the diameter of the one end portion 12a of the metal pipe 12 is larger than that of the other end portion 12b. That is, the one end portion 12a side of the metal pipe 12 has a large diameter whereas the other end portion 12b side has a small diameter to form a large diameter portion 12f and a small diameter portion 12g. The small diameter of the metal pipe 12 is a diameter with which the honeycomb structure 1 is just engaged. The large diameter of the metal pipe 12 is formed larger than the outer diameter of the honeycomb structure 1. This form enables to connect metal pipes 12 together by inserting the other end portion 12b of another metal pipe 12 into the one end portion 12a of a metal pipe 12 as shown in FIG. 5.

Next, a method for manufacturing a heat exchanger element 10 of the present invention will be described. FIG. 4 is a schematic view showing a step for manufacturing a metal-engaging honeycomb structure 11 by integrating a honeycomb structure 1 and a metal pipe 12. In the first place, as shown in FIG. 4, a metal pipe 12 provided with a connecting means capable of connecting the metal pipe 12 to another metal pipe 12 in the end portion is engaged with the outer peripheral face 7h of a honeycomb structure 1 having cells 3 separated and formed by partition walls 4 containing SiC and functioning as passages which extend from one end face 2 to the other end face 2 and which a first fluid passes through and an outer peripheral wall 7 disposed on the outer periphery of the cells 3 to obtain a metal-engaging honeycomb structure 11 (heat exchanger element 10) as shown in FIGS. 3A and 3B.

Figure 5:
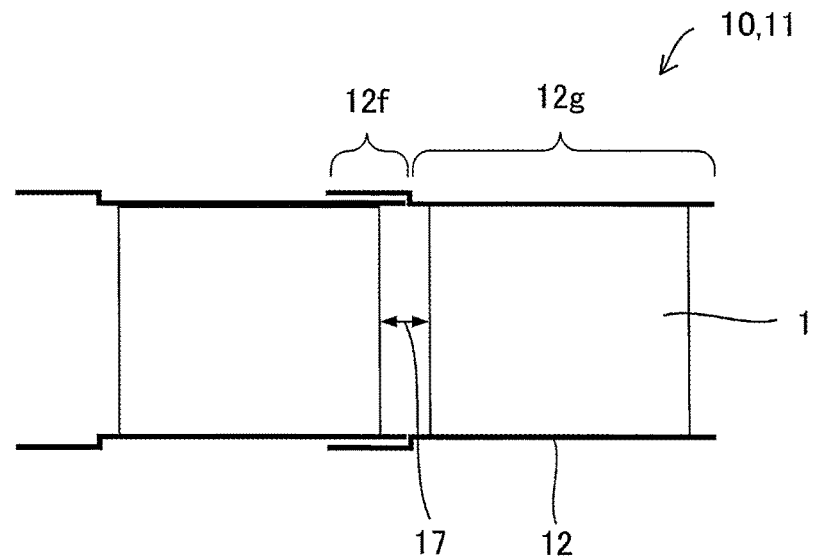
FIG. 5 is a schematic view showing an embodiment of a heat exchanger element where honeycomb structures are arranged with a gap therebetween.

Then, as shown in FIG. 5, the metal pipes 12 of the metal-engaging honeycomb structures 11 (heat exchanger elements 10) are connected to each other with a connecting means to arrange the honeycomb structures 1 serially. That is, the large diameter portion 12f and the small diameter portion 12g are the connecting means, and, by connecting the metal pipes 12 by the connecting means, the honeycomb structures 1 are arranged serially with a gap 17 therebetween. The arrangement of honeycomb structures 1 having a gap 17 therebetween enables the first fluid flowing through the cells 3 to be mixed in the gap 17, and the flow becomes turbulent, thereby facilitating heat transfer from the first fluid to the partition walls 4 and the outer peripheral walls 7 and improves the temperature efficiency in comparison with the case of the honeycomb structures 1 with no gap 17 therebetween.

The connection of the metal-engaging honeycomb structures 11, that is, the connection of the metal pipes 12 may be performed by mechanical tightening such as press fitting, shrink fitting, or swaging of the metal pipes 12.

In addition, the connection of the metal-engaging honeycomb structures 11 may be performed by a chemical connection such as brazing and soldering or welding of the metal pipes 12.

With making the metal-engaging honeycomb structure 11 as one unit, a plurality of metal-engaging honeycomb structures 11 are connected together to be able to use them as a heat exchanger element 10. This enables to increase a degree of freedom of design such as forming the gap 17 between adjacent honeycomb structures 1 and making the angle of the cells 3 in the honeycomb structures 1 different from one another.

A metal pipe 12 having heat resistance and corrosion resistance is preferable, and, for example, a stainless steel, titanium, copper, and brass may be used. Since the connection portion is formed of metal, mechanical tightening such as press fitting, shrink fitting, or swaging or chemical connection such as brazing and soldering or welding can be selected with no inhibition according to the use or facilities in possession.

The honeycomb structure 1 is formed of ceramic into a cylindrical shape and has fluid passages extending through from one end face 2 to the other end face 2 in the axial direction. The honeycomb structure 1 has partition walls 4, and a large number of cells 3 functioning as fluid passages are separated and formed by the partition walls 4. The presence of the partition walls 4 enables to collect heat from the fluid passing through the inside of the honeycomb structure 1 efficiently and transfer the heat to the outside.

The external shape of the honeycomb structure 1 is not limited to a cylindrical shape (circular columnar shape), and a cross section perpendicular to the axial (longitudinal) direction may have an elliptic shape, a race track shape, or other various shapes. The cross section may have a quadrangular shape or other polygonal shapes, and the external shape may be prismatic.

In the honeycomb structure 1, it is preferable to use ceramic excellent in heat resistance. If the heat transfer performance is particularly considered, it is preferable that SiC (silicon carbide) having high heat conductivity is the main component. Incidentally, the main component means that at least 50% by mass of the honeycomb structure 1 is silicon carbide.

It is not always necessary that the entire honeycomb structure 1 is constituted of SiC (silicon carbide) as long as SiC (silicon carbide) is contained in the main body. That is, it is preferable that the honeycomb structure 1 is made of ceramic containing SiC (silicon carbide).

However, since even silicon carbide cannot obtain high coefficient of heat conductivity when it is a porous body, it is preferable to obtain a dense body structure by impregnating the porous body with silicon in the production process of the honeycomb structure 1. By the dense body structure, high coefficient of heat conductivity can be obtained. For example, in the case of a SiC (silicon carbide) porous body, it is about 20 W/m·K whereas, in a densified body, it can be made about 150 W/m·K. In the present specification, the densified body means a body having a porosity of 20% or less.

As a material of the honeycomb structure 1, Si-impregnated SiC, (Si+Al)-impregnated SiC, metal composite SiC, recrystallized SiC, $Si_3N_4$, SiC, or the like may be employed. However, in order to obtain a densified body structure for obtaining high temperature efficiency, Si-impregnated SiC or (Si+Al)-impregnated SiC can be employed. Since Si-impregnated SiC has a structure where a coagulation of metal silicon melt surrounds the surface of a SiC particle and where SiC is unitarily bonded by means of metal silicon, silicon carbide is blocked from an atmosphere containing oxygen and inhibited from oxidation. Further, though SiC is characterized by high coefficient of heat conductivity and easy heat dissipation, SiC impregnated with Si is formed densely while showing high coefficient of heat conductivity and heat resistance, thereby showing sufficient strength as a heat transfer member. That is, a honeycomb structure 1 formed of a Si—SiC based [Si-impregnated SiC, (Si+Al)-impregnated SiC] material shows a characteristic excellent in corrosion resistance against acid and alkali in addition to heat resistance, thermal shock resistance, and oxidation resistance and shows a high coefficient of heat conductivity.

As the cell shape in a cross section perpendicular to the axial direction of the cells 3 of the honeycomb structure 1, a desired shape may appropriately be selected from a circle, an ellipse, a triangle, a quadrangle, other polygons, and the like.

Though the cell density (i.e., the number of cells per unit cross-sectional area) of the honeycomb structure 1 is not particularly limited and may appropriately be designed according to the purpose, it is preferably within the range from 25 to 2000 cells/sq.in. (4 to 320 cells/cm$^2$). When the cell density is lower than 25 cells/sq.in., the strength of the partition walls 4 and eventually the strength and the effective GSA (geometric surface area) of the honeycomb structure 1 itself may be insufficient. On the other hand, when the cell density is above 2000 cells/sq.in., pressure drop may increase when a heat medium flows.

The number of cells per one honeycomb structure 1 is desirably 1 to 10,000, particularly desirably 200 to 2,000. When the number of the cells is too large, the honeycomb structure itself becomes large, and therefore the heat conduction distance from the first fluid side to the second fluid side becomes long, which increases the heat conduction loss and reduces heat flux. In the case where the number of cells is small, the heat transfer area on the first fluid side becomes small, and the heat resistance on the first fluid side can not be reduced, which reduces heat flux.

The thickness of the partition walls 4 (wall thickness) of the cells 3 of the honeycomb structure 1 is not particularly limited and may appropriately be designed according to the purpose. The wall thickness is preferably 50 μm to 2 mm, more preferably 60 to 500 μm. When the wall thickness is made to be 50 μm or more, mechanical strength is improved, and breakage is hardly caused due to shock or thermal stress. On the other hand, when it is made to be 2 mm or less, there is caused no defect such as increase in the pressure drop of the fluid or decrease in temperature efficiency of heat medium permeation.

The density of the partition walls 4 of the cells 3 of the honeycomb structure 1 is preferably 0.5 to 5 g/cm$^3$. The aforementioned range enables to make the honeycomb structure 1 strong. In addition, the effect of improving the coefficient of heat conductivity can be obtained.

The honeycomb structure 1 has a coefficient of heat conductivity of preferably 100 W/m·K or more, more preferably 120 to 300 W/m·K, furthermore preferably 150 to 300 W/m·K. This range makes the heat conductivity good and enables the heat in the honeycomb structure 1 to be discharged efficiently outside the metal pipe 12.

In the case where the first fluid (high temperature side) passed through a heat exchanger 30 (see FIG. 13) using the heat exchanger element 10 is exhaust gas, it is preferable that a catalyst is loaded on the partition walls inside the cells 3 of the honeycomb structure 1 where the first fluid (high temperature side) passes. This is because it becomes possible to exchange also reaction heat (exothermic reaction) generated upon exhaust gas purification in addition to the role of purifying exhaust gas. It is good to contain at least one element selected from the group consisting of noble metals (platinum, rhodium, palladium, ruthenium, indium, silver, and gold), aluminum, nickel, zirconium, titanium, cerium, cobalt, manganese, zinc, copper, tin, iron, niobium, magnesium, lanthanum, samarium, bismuth, and barium. These may be metals, oxides, or other compounds.

The amount of the catalyst (catalyst metal+carrier) loaded on the partition walls 4 of the cells 3 of the first fluid passage portion 5 of the honeycomb structure 1 where the first fluid (high temperature side) passes is preferably 10 to 400 g/L, and if it is noble metal, further preferably 0.1 to 5 g/L. This range enables to exhibit the catalytic action sufficiently. In addition, it inhibits rise in production costs besides increase of the pressure drop.

Figure 6A:
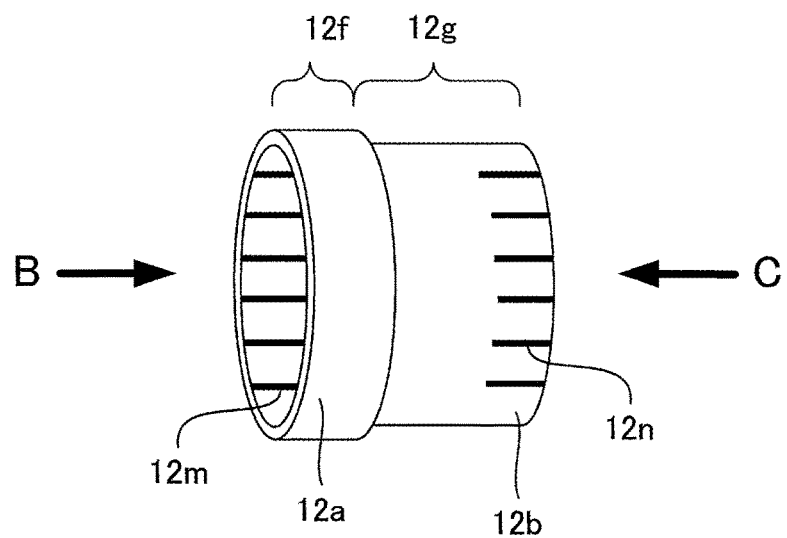
FIG. 6A is a schematic view showing an embodiment where a convex portion and a concave portion are formed in a metal pipe.
Figure 6B:
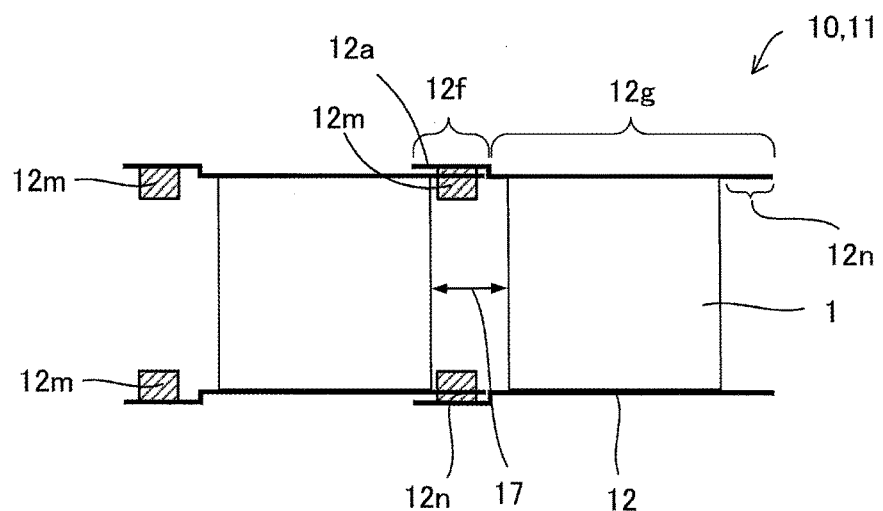
FIG. 6B is a schematic view showing an embodiment of a heat exchanger element connected with metal pipes each having a convex portion and a concave portion formed therein.
Figure 7A:
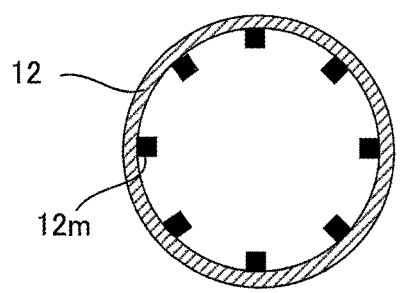
FIG. 7A is the B arrow view of FIG. 6A.
Figure 7B:
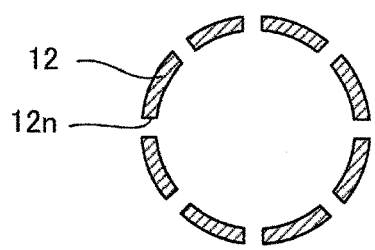
FIG. 7B is the C arrow view of FIG. 6A.

FIGS. 6A and 6B and FIGS. 7A and 7B show an embodiment where convex portions 12m and the concave portions 12n are formed in the metal pipes 12. FIG. 6A is a schematic view showing an embodiment where convex portions 12m and concave portions 12n are formed in a metal pipe 12. FIG. 6B is a schematic view showing an embodiment of heat exchanger elements 10 connected with metal pipes 12 each having convex portions 12m and concave portions 12n formed therein. Further, FIG. 7A is the B arrow view of FIG. 6A, and FIG. 7B is the C arrow view of FIG. 6A.

In the embodiment shown in FIGS. 6A and 6B and FIGS. 7A and 7B, the diameter of the one end portion 12a of the metal tube 12 is formed larger than that of the other end portion 12b, and further the convex portions 12m protruding inside in the diametral directions are formed on the one end portion 12a. Furthermore, the concave portions 12n depressed in the diametral directions are formed in the end portion opposite to the end portion where the convex portions 12m are formed. As shown in FIG. 6B, the concave portions 12n are formed as groove portions. This enables to connect the metal pipes 12 to each other by engaging the convex portions 12m of one metal pipe 12 with the concave portions 12n of another metal pipe 12.

Figure 8:
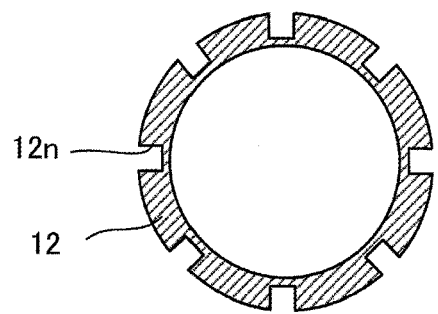
FIG. 8 is a schematic view showing another embodiment of concave portions.

FIG. 8 is a schematic view showing another embodiment of concave portions 12n. In FIG. 8, the concave portions 12n are formed as bottomed groove portions.

Figure 9A:
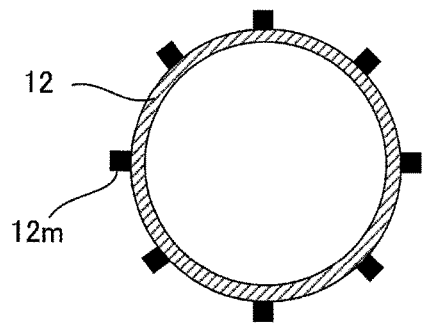
FIG. 9A is a schematic view showing another embodiment where convex portions are formed on a metal pipe.
Figure 9B:
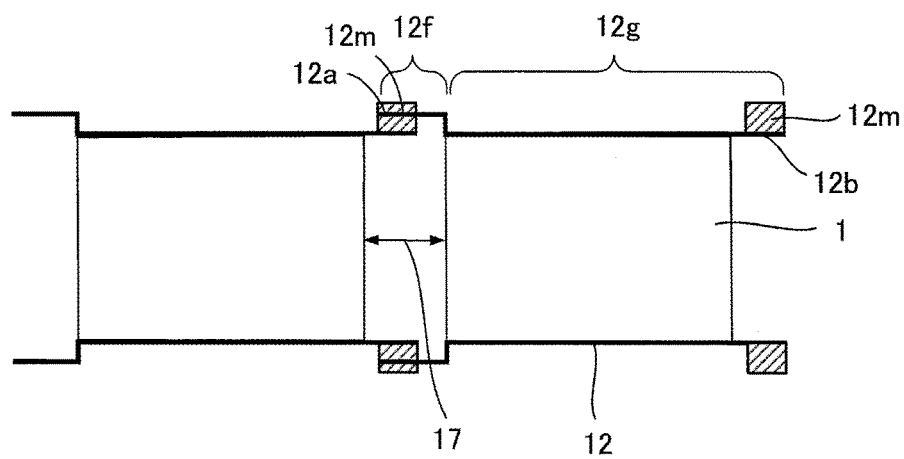
FIG. 9B is a schematic view showing another embodiment of heat exchanger elements connected with the metal pipes each having the convex portions shown in FIG. 9A.

FIG. 9A is a schematic view showing another embodiment where convex portions 12m are formed on the metal pipe 12. FIG. 9B is a schematic view showing another embodiment of the heat exchanger elements 10 connected with the metal pipe 12 where the convex portions 12m shown in FIG. 9A are formed. The convex portions 12m protruding outside in the diametral direction are formed on the other end portion 12b of the small diameter portion 12g. In addition, the concave portions 12n depressed in the diametral directions are formed on the one end portion 12a, which is the end portion of the large diameter portion 12f on the side opposite to the end portion where the convex portions 12m are formed. This connects the metal pipes 12 to each other by engaging the convex portions 12m of one metal pipe 12 with the concave portions 12n of another metal pipe 12.

Figure 10:
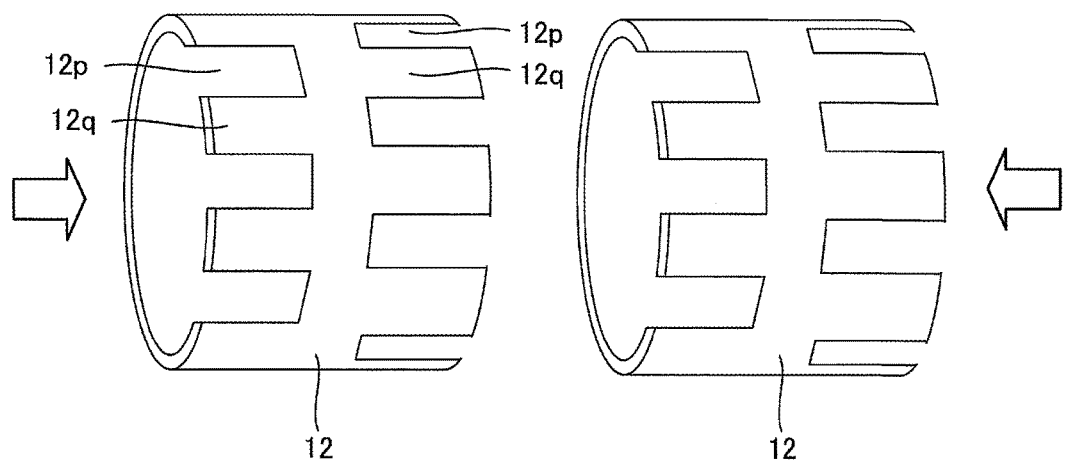
FIG. 10 is a schematic view showing an embodiment where notched portions are formed in metal pipes.

FIG. 10 is a schematic view showing an embodiment where notched portions 12p are formed in metal pipes 12. That is, as the connecting means, notched portions 12p depressed in the axial direction are formed in each end portion. The remaining portions other than the notched portions 12p are unnotched portions 12q. The metal pipes 12 are connected to each other by engaging the notched portions 12p of a metal pipe 12 with the unnotched portions 12q, which are not notched portions, of another metal pipe 12.

Figure 11A:
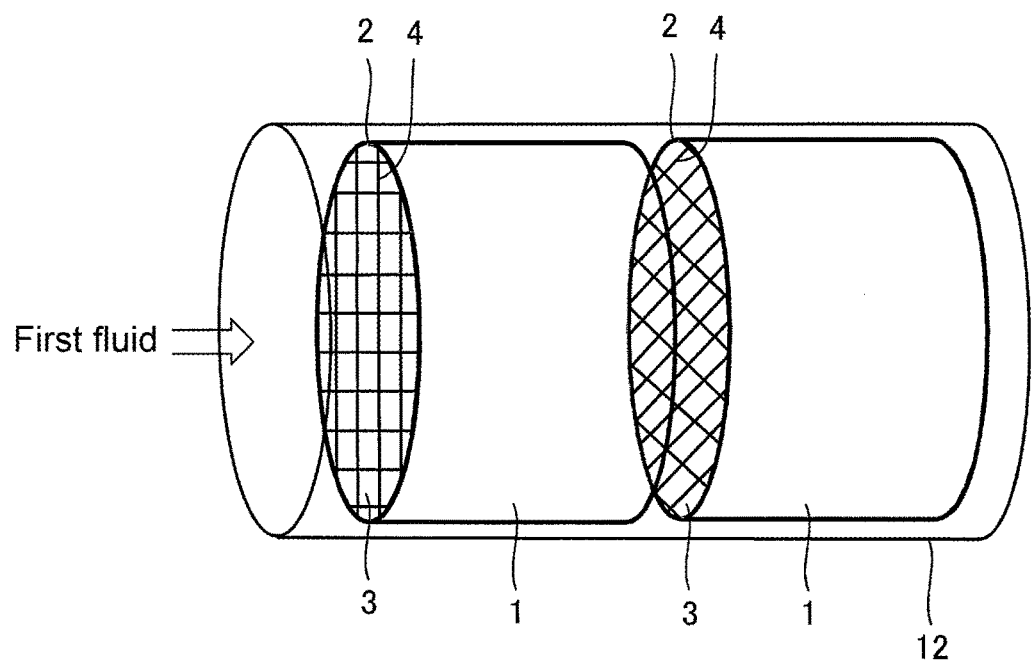
FIG. 11A is a schematic view showing an embodiment of a heat exchanger element where honeycomb structures are connected so that the cell angles of the honeycomb structures are out of alignment.

As shown in FIG. 11A, it is also preferable to connect honeycomb structures 1 so that angles of the cells 3 are out of alignment (In FIG. 11A, the metal pipes 12 are simplified. The same goes for FIGS. 11B to 11G.). That is, it is also preferable to rotate at least one honeycomb structure 1 with the central axis of the honeycomb structure 1 as the center so that the directions of the partition walls of the cells 3 are not coincide with those of the other honeycomb structure(s) 1. This enables to obtain an effect of increasing the passage resistance of the fluid passing through the cells 3. In addition, between the end faces 2 forming the gap 17, the first fluid flowing in the cells 3 are mutually mixed. This enables to increase the heat transaction with the fluid.

Figure 16A:
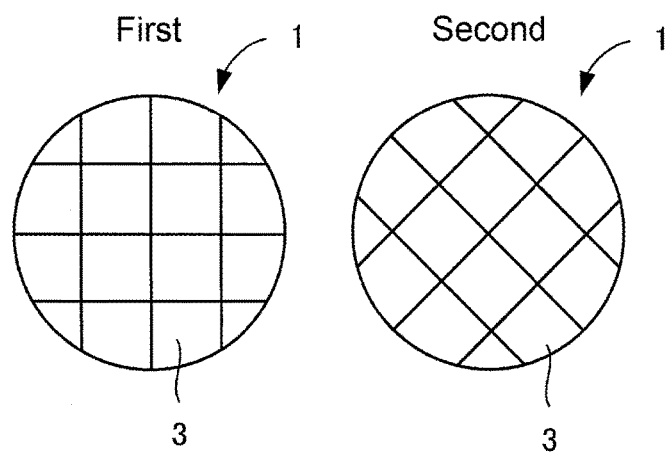
FIG. 16A is a schematic view showing end faces in the axial direction of honeycomb structures in the case where two honeycomb structures are connected serially and where the second honeycomb structure has the same cell structure as that of the first honeycomb structure and is rotated with the central axis as the center.

FIG. 16A is a schematic view showing end faces 2 in the axial direction of honeycomb structures 1 in the case where two honeycomb structures 1 are connected serially. The honeycomb structure 1 on the first fluid inlet side is defined as the first, and the honeycomb structure 1 on the first fluid outlet side is defined as the second. The second honeycomb structure 1 has the same cell structure as that of the first honeycomb structure 1 and is rotated with the central axis as the center in the same manner as in FIG. 11A. Here, the same cell structure means the cell structure having the same cell shape, pitch, partition wall thickness, and the like (In the present specification, the same cell structure include a structure having dislocated cell intersections 3a, and the structure having dislocated cell intersections 3a may be referred to as an intersection-dislocated same cell structure.).

Though an example where two honeycomb structures 1 are connected to each other serially, three or more honeycomb structures 1 may be connected serially, and the second and the third may have the aforementioned relation of rotation. That is, the $n^{th}$ (n=1, 2, 3, . . . ) and the $n+1^{th}$ may have the aforementioned relation of rotation.

Figure 11B:
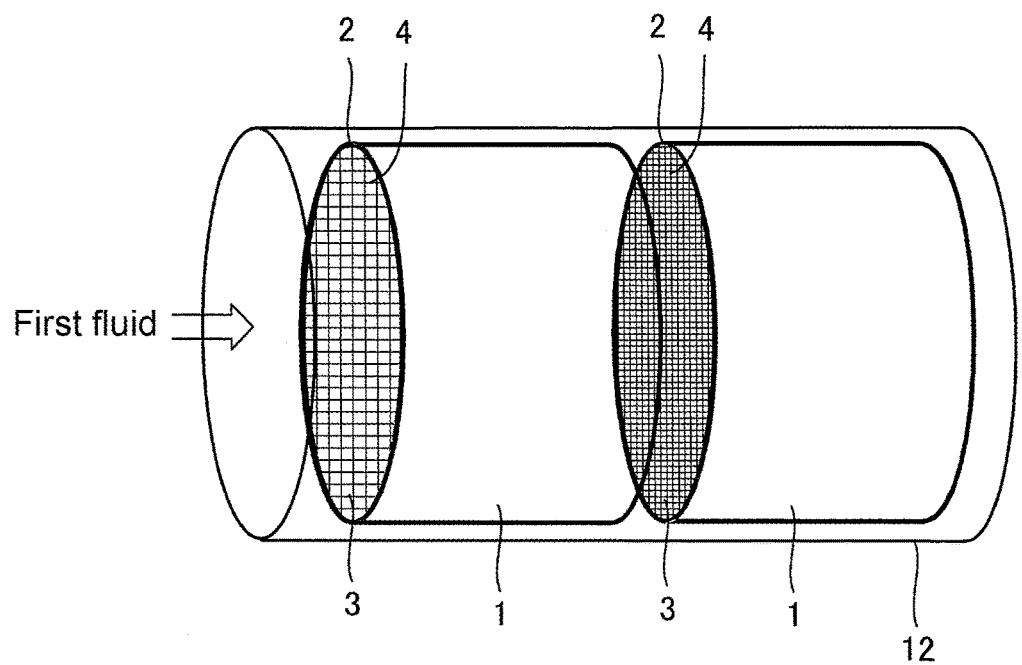
FIG. 11B is a schematic view of an embodiment of a heat exchanger element where adjacent honeycomb structures having different cell densities are connected to each other.

In addition, as shown in FIG. 11B, it is also preferable to perform connection so that the cell density of the cells 3 of adjacent honeycomb structures 1 is differentiated. This enables to obtain an effect of increasing the passage resistance of a fluid passing through the cells 3. This enables to increase the heat transaction with the fluid. It is also possible to make the thickness of the partition walls different between the honeycomb structures 1 on the inlet side and the outlet side of the first fluid. FIG. 11B is an embodiment where the cell density of the honeycomb structure 1 on the outlet side is higher than that of the honeycomb structure 1 on the inlet side.

Figure 11C:
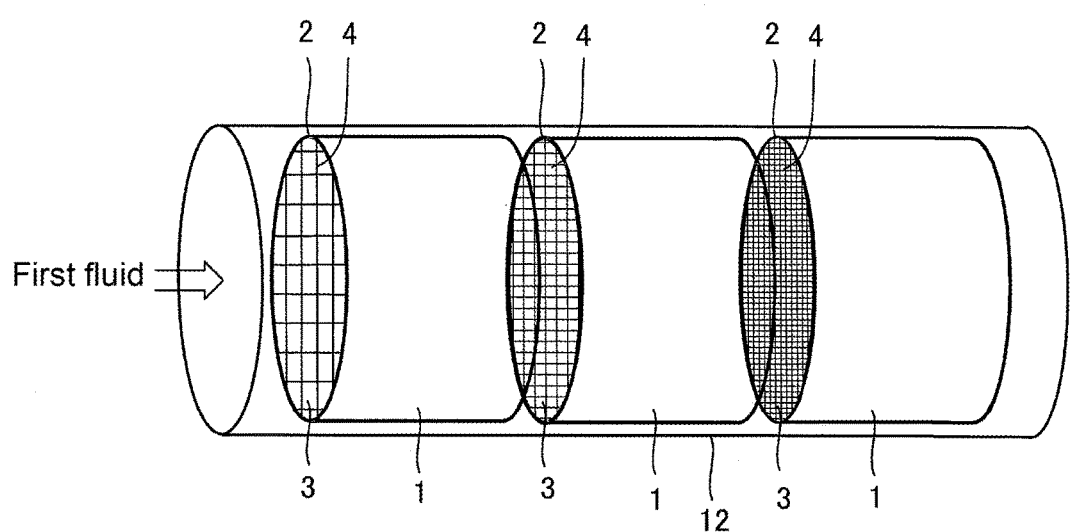
FIG. 11C is a schematic view showing an embodiment where the second honeycomb structure has a higher cell density than that of the honeycomb structure closest to the inlet, and the third honeycomb structure has a higher cell density than that of the second honeycomb structure.

FIG. 11C shows an embodiment where honeycomb structures 1 having a higher cell density than that of the honeycomb structure closest to the inlet of the first fluid are arranged at the second and the subsequent positions (including the second position). The second honeycomb structure 1 has a higher cell density than that of the first honeycomb structure 1 (closest to the inlet), and the third honeycomb structure 1 has an even higher cell density. The higher the flow rate of the first fluid becomes, the more the heat passes up to the outlet side in the rear section without being recovered. However, heat can be recovered sufficiently by providing a honeycomb structure 1 having a high cell density. That is, in the case where the flow rate of the first fluid is high, the temperature efficiency can be improved by providing a honeycomb structure 1 having a high cell density in the rear portion.

Figure 11D:
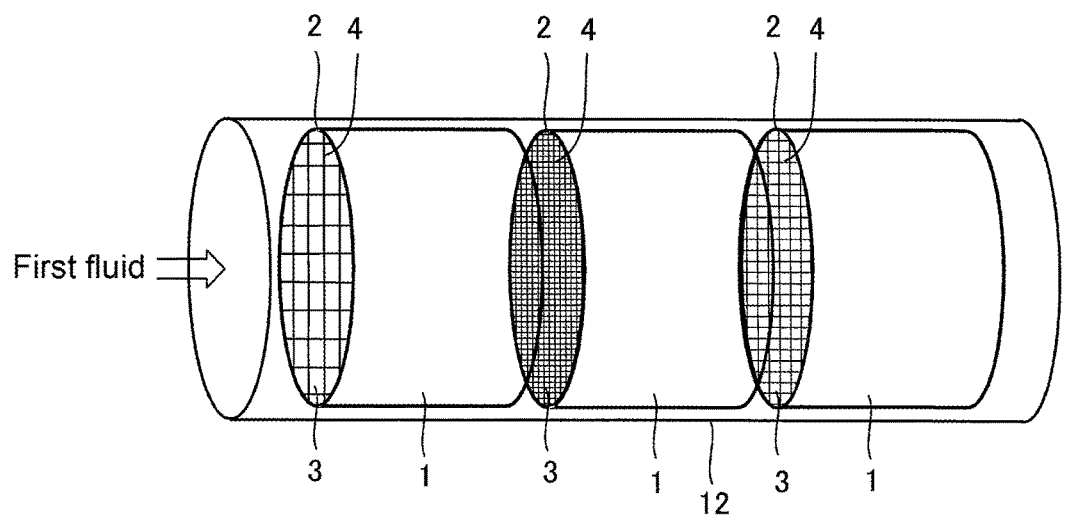
FIG. 11D is a schematic view of an embodiment where the second honeycomb structure has the highest cell density, and the third honeycomb structure has the second highest cell density.

FIG. 11D shows another embodiment where honeycomb structures 1 having a higher cell density than that of the honeycomb structure 1 located closest to the inlet of the first fluid are arranged in the second and the subsequent positions from the inlet side. In the present embodiment, the second honeycomb structure 1 has the highest cell density, and the cell density of the third honeycomb structure 1 is higher than that of the first honeycomb structure 1 and lower than that of the second honeycomb structure 1. As the flow rate of the first fluid becomes lower, almost all the heat is recovered on the inlet side. When the honeycomb structure 1 having a high cell density is disposed at the second position, the heat of the first fluid can efficiently be recovered while inhibiting the rise of the pressure drop. That is, in the case where the flow rate of the first fluid is low, the temperature efficiency can be improved by increasing the cell density of the second honeycomb structure 1.

Figure 11E:
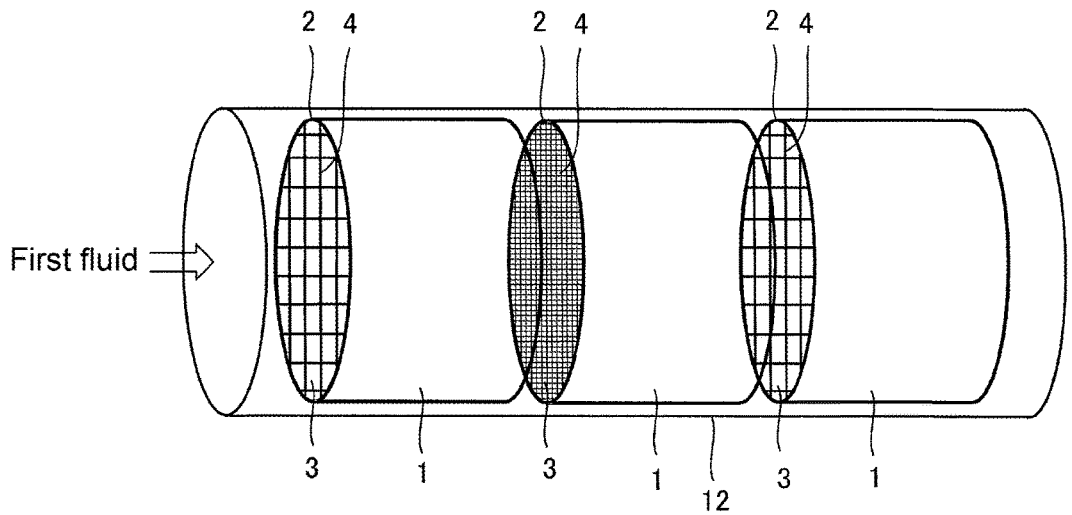
FIG. 11E is a schematic view of an embodiment where the second honeycomb structure has a higher cell density, and the first honeycomb structure and the third honeycomb structure have the same cell density.

FIG. 11E is an embodiment where the second honeycomb structure 1 has an increased cell density. In the present embodiment, the first and third honeycomb structures 1 have the same cell density. In the present embodiment, the temperature efficiency can be improved in the case where the flow rate of the first fluid is high, and pressure drop can be suppressed because the cell density of the third is not high.

Though the pressure drop becomes large when the cell density of all the honeycomb structures 1 is increased, the temperature efficiency can be improved with suppressing the pressure drop by making the cell density of the honeycomb structure 1 in the rear portion higher than that of the first honeycomb structure 1 according to the flow rate of the first fluid.

In FIGS. 11C to 11E, embodiments where three honeycomb structures 1 are arranged serially have been described. However, even in the case where four or more honeycomb structures 1 are arranged, the temperature efficiency can be improved by making the cell density of the second and the subsequent honeycomb structures 1 higher than that of the first honeycomb structure 1.

Figure 16B:
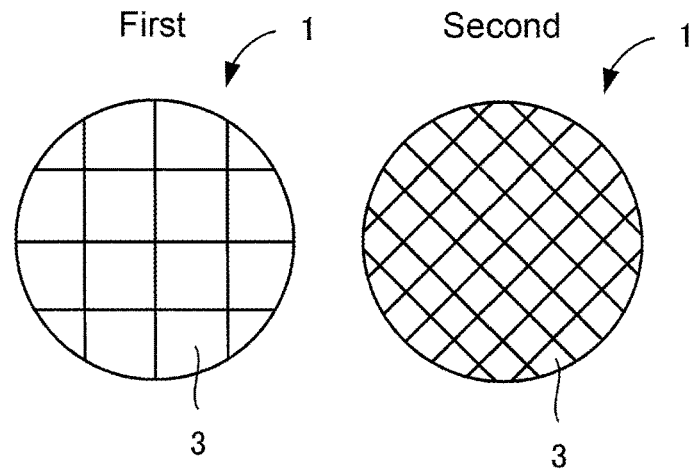
FIG. 16B is a schematic view showing an embodiment where the second honeycomb structure has a higher cell density than that of the first honeycomb structure and is rotated with the central axis as the center.

FIG. 16B is a schematic view showing the end faces 2 in the axial direction of the honeycomb structures 1 in the case where two honeycomb structures 1 are connected to each other serially. The cell density of the second honeycomb structure 1 is higher than that of the first honeycomb structure 1, and the second honeycomb structure 1 is rotated with the central axis as the center. By thus increasing the cell density of the second honeycomb structure 1 and rotating it, the temperature efficiency can be improved.

Figure 11F:
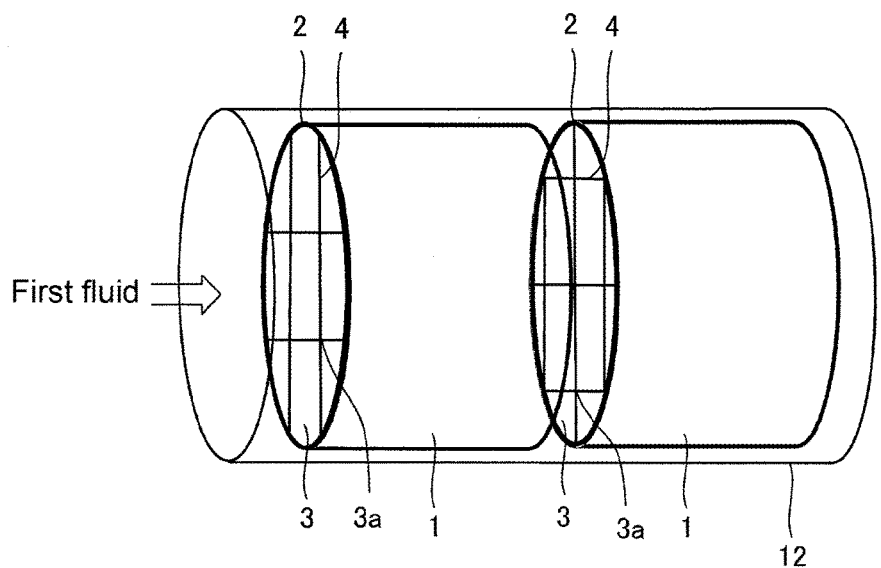
FIG. 11F is a schematic view of an embodiment where the honeycomb structures connected serially have the same cell structure, and, with respect to the position of the cell intersections of one honeycomb structure, the positions of the cell intersections of the other honeycomb structure are out of alignment.
Figure 11G:
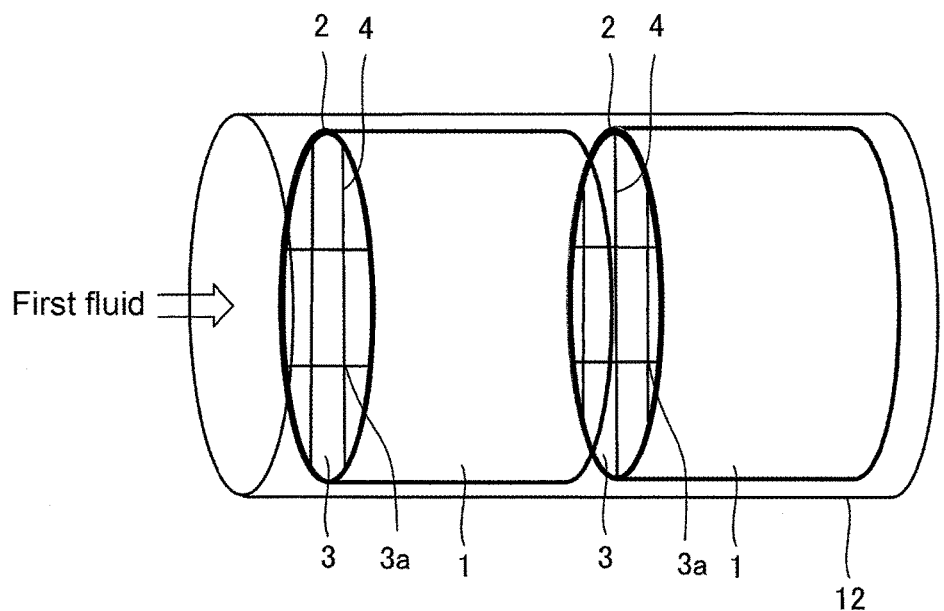
FIG. 11G is a schematic view of another embodiment where the honeycomb structures connected serially have the same cell structure, and, with respect to the position of the cell intersections of one honeycomb structure, the positions of the cell intersections of the other honeycomb structure are out of alignment.

FIG. 11F shows an embodiment where the honeycomb structures 1 connected to each other serially have the same cell structure, and the position of the cell intersection 3*a* of at least another honeycomb structure is dislocated with respect to the position of the cell intersection 3*a* of one honeycomb structure 1. That is, the first fluid having entered the cells 3 of the first honeycomb structure 1 easily touches the cell intersection 3*a* of the second honeycomb structure 1, in other words, easily touches the partition walls 4 of the end face 2, thereby improving the temperature efficiency. In FIG. 11F, the position of the cell intersection 3*a* is dislocated in both the vertical and horizontal directions, whereas FIG. 11G shows an embodiment where the position of the cell intersection 3*a* is dislocated in only one direction.

Figure 16C:
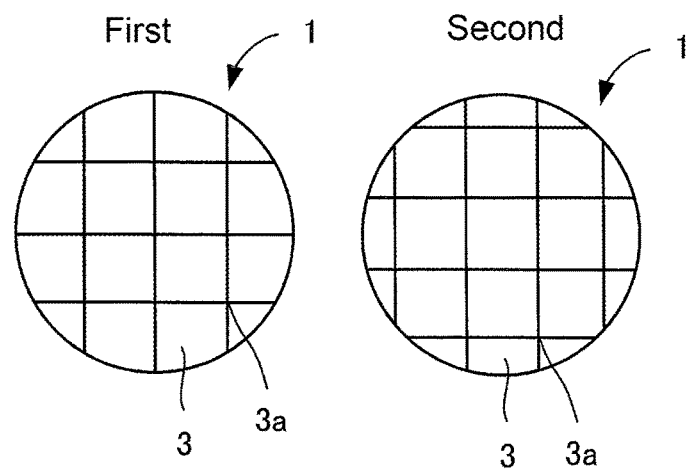
FIG. 16C is a schematic view showing an embodiment where the second honeycomb structure has the same cell structure as that of the first honeycomb structure, and the position of the cell intersections are out of alignment.

FIG. 16C is a schematic view showing the end faces 2 in the axial direction of the honeycomb structure 1 in the case where two honeycomb structures 1 are connected to each other serially. The embodiment shows the intersection-dislocated same cell structure, where the second honeycomb structure 1 has the same cell structure as that of the first honeycomb structure 1, and the position of the cell intersection 3*a* is dislocated.

Figure 16D:
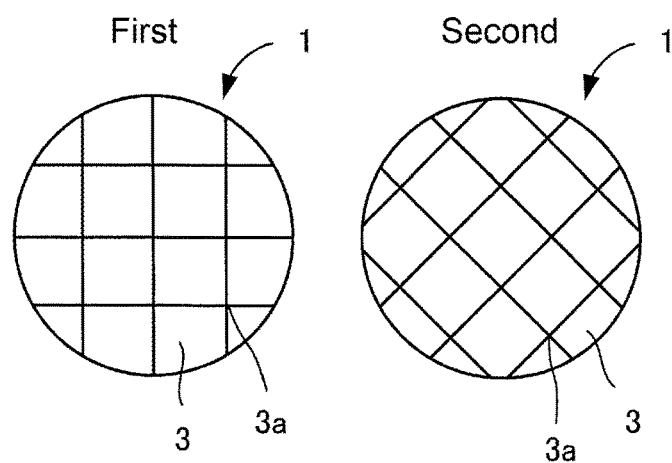
FIG. 16D is a schematic view showing an embodiment where the second honeycomb structure has the same cell structure as that of the first honeycomb structure, and the cell intersections are out of alignment and rotated.

Also, FIG. 16D is a schematic view showing the end faces 2 in the axial direction of the honeycomb structure 1 in the case where two honeycomb structures 1 are connected to each other serially. The embodiment shows the intersection-dislocated same cell structure, where the second honeycomb structure 1 has the same cell structure as that of the first honeycomb structure 1, and the position of the cell intersection 3*a* is dislocated. Further, the second honeycomb structure 1 of the intersection-dislocated same cell structure is rotated with the central axis as the center. Since the position of the cell intersection 3*a* of the second honeycomb structure 1 is dislocated with respect to the position of the cell intersection 3*a* of the first honeycomb structure 1 and rotated, the first fluid having passed through the cells 3 of the first honeycomb structure 1 easily touches the position of the cell intersection 3*a* of the second honeycomb structure 1, thereby improving the temperature efficiency.

Figure 12A:
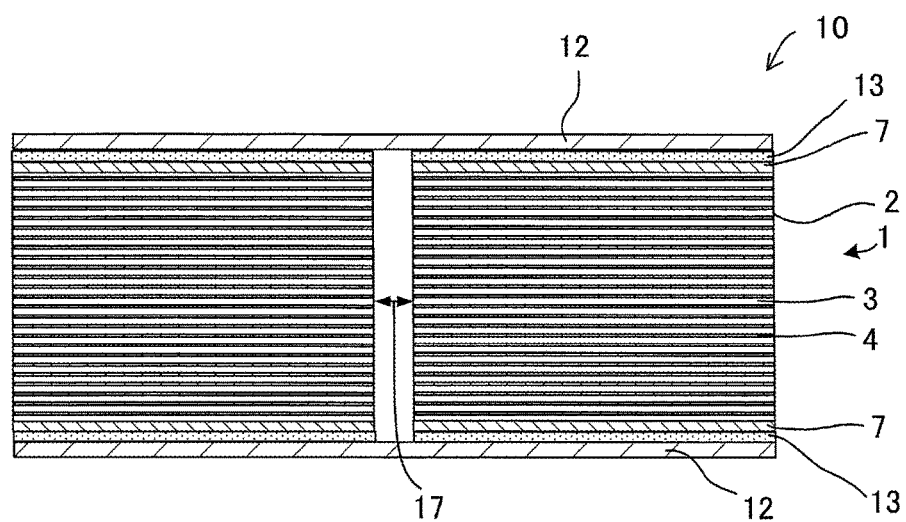
FIG. 12A is a schematic view showing an embodiment of a heat exchanger element having a graphite sheet between the honeycomb structures and the metal pipe.
Figure 12B:
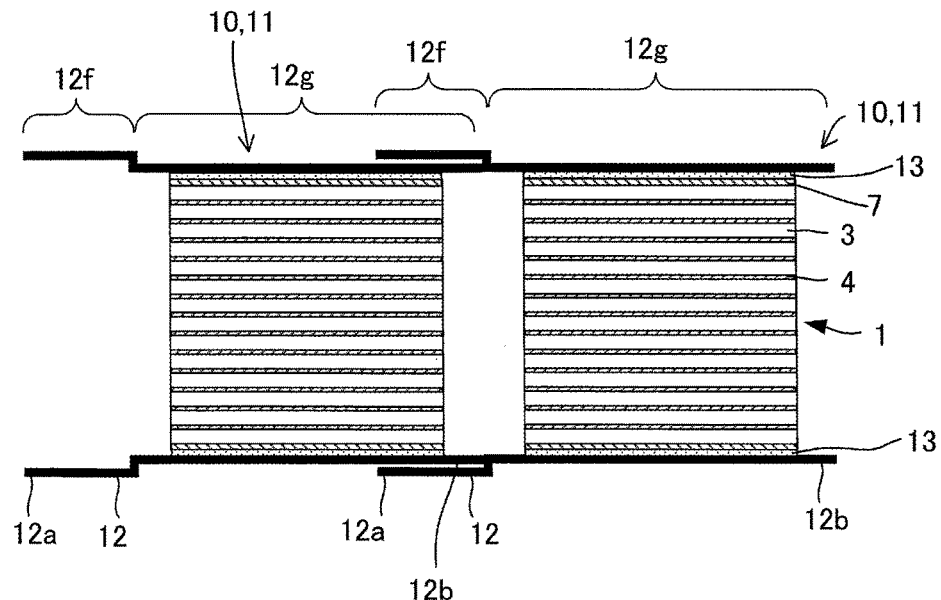
FIG. 12B is a schematic view showing another embodiment of a heat exchanger element having a graphite sheet between the honeycomb structures and the metal pipe.

FIGS. 12A and 12B show an embodiment of a heat exchanger element 10 having a heat resistance reduction layer 13 for reducing the contact heat resistance of the interface and improving the temperature efficiency between the honeycomb structure 1 and the metal pipe 12 engaged with the outer peripheral face of the honeycomb structure 1. As a material for the heat resistance reduction layer 13, soft metals such as aluminum, copper, and lead, alloy materials such as solder, or carbon based materials such as a graphite sheet are desirable.

The metal pipe 12 and the honeycomb structure 1 can be engaged with each other by shrink fitting in a state where a heat resistance reduction layer 13 is sandwiched therebetween. By integrating the metal pipe 12 and the honeycomb structure 1, mixing of the first fluid and the second fluid can be inhibited.

Figure 13:
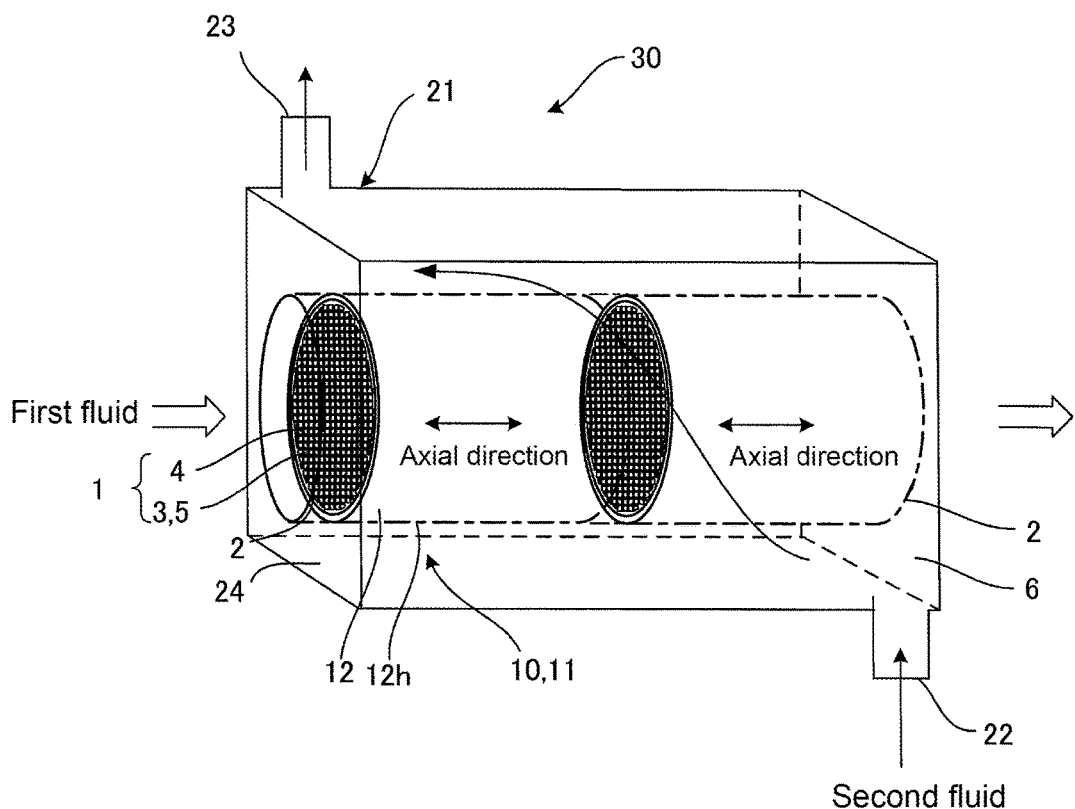
FIG. 13 is a schematic view showing one embodiment of a heat exchanger including a heat exchanger element of the present invention.
Figure 14A:
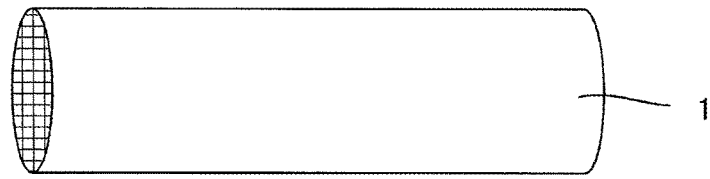
FIG. 14A is a schematic view showing Comparative Example 1.
Figure 14B:
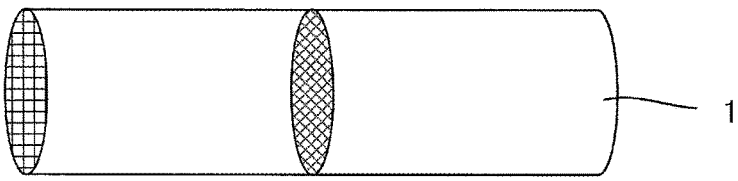
FIG. 14B is a schematic view showing Comparative Example 2.
Figure 14C:
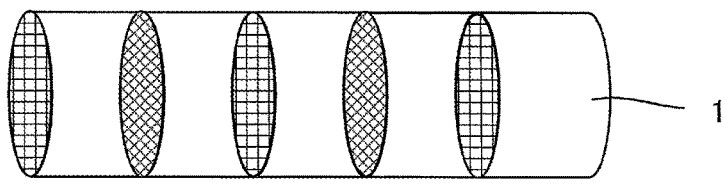
FIG. 14C is a schematic view showing Comparative Example 3.
Figure 14D:
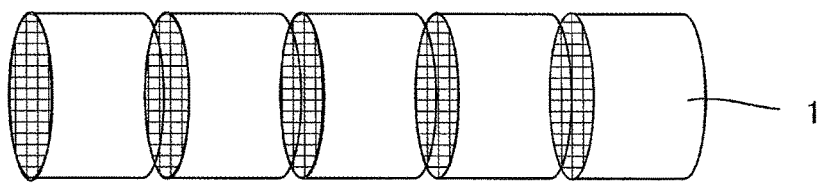
FIG. 14D is a schematic view showing Example 1.
Figure 14E:
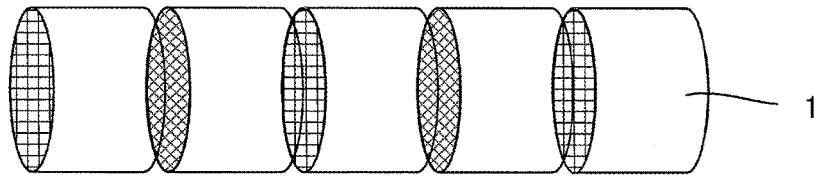
FIG. 14E is a schematic view showing Example 2.
Figure 15A:
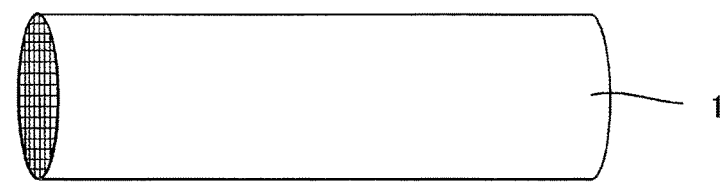
FIG. 15A is a schematic view showing Comparative Example 4.
Figure 15B:
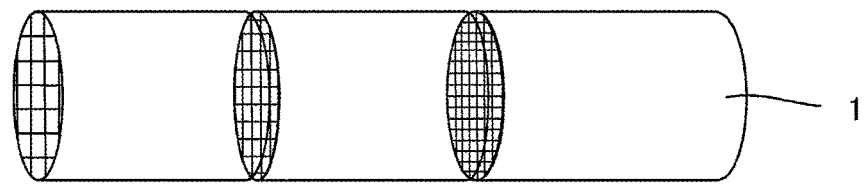
FIG. 15B is a schematic view showing Example 9.
Figure 15C:
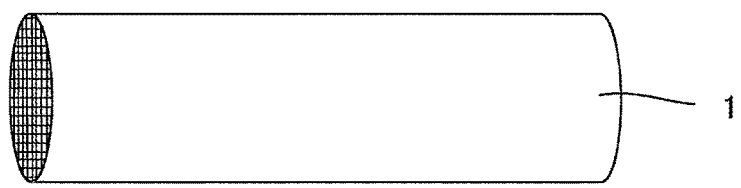
FIG. 15C is a schematic view showing Comparative Example 5.
Figure 15D:
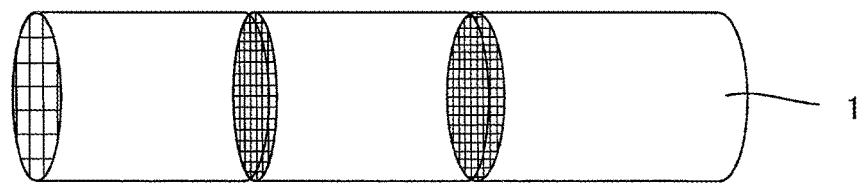
FIG. 15D is a schematic view showing Example 10.

FIG. 13 shows a perspective view of a heat exchanger 30 including a heat exchanger element 10 of the present invention. As shown in FIG. 13, the heat exchanger 30 is formed of the heat exchanger element 10 and the casing 21 containing the heat exchanger element 10 inside the casing. The cells 3 of the honeycomb structure 1 function as the first fluid passage portion 5 where the first fluid flows. The heat exchanger 30 is configured so that the first fluid having higher temperature than the second fluid flows through the cells 3 of the honeycomb structure 1. In addition, the second fluid inlet port 22 and the second fluid outlet port 23 are formed in the casing 21, and the second fluid flows over the outer peripheral face 12*h* of the metal pipe 12 of the heat exchanger element 10.

That is, the second fluid passage portion 6 is formed of the inside face 24 of the casing 21 and the outer peripheral face 12*h* of the metal pipe 12. The second fluid passage portion 6 is a passage portion for the second fluid formed of the casing 21 and the outer peripheral face 12*h* of the metal pipe 12, is separated from the first fluid passage portion 5 by the partition walls 4 and the outer peripheral wall 7 of the honeycomb structure 1 and the metal pipe 12, can conduct heat, receives the heat of the first fluid flowing through the first fluid passage portion 5 via the partition walls 4, outer peripheral wall 7, and metal pipe 12, and transfers the heat to the body to be heated, which is the second fluid flowing therethrough. The first fluid and the second fluid are completely separated from each other, and it is configured lest these fluids should be mixed together.

It is preferable that the heat exchanger 30 allows the first fluid having higher temperature than the second fluid to flow to conduct the heat from the first fluid to the second fluid. By allowing gas to flow as the first fluid and allowing liquid to flow as the second fluid, heat exchange between the first fluid and the second fluid can be performed efficiently. That is, a heat exchanger 30 of the present invention can suitably be used as a gas/liquid heat exchanger.

As the heating body, which is the first fluid allowed to flow through a heat exchanger 30 of the present invention having the aforementioned configuration, there is no particular limitation as long as it is a medium having heat, such as gas and liquid. For example, an automobile exhaust gas can be mentioned as the gas. In addition, there is no particular limitation on the body to be heated as the second fluid, which takes heat (exchanges heat) from the heating body, as long as it is a medium having lower temperature than the heating body, such as gas and liquid.

Next, a manufacturing method of a heat exchanger element 10 of the present invention will be described. In the first place, a kneaded material including a ceramic powder is extruded into a desired shape to manufacture a honeycomb formed body. As the material for the honeycomb structure 1, the aforementioned ceramics may be used. For example, in the case of manufacturing a honeycomb structure 1 having Si-impregnated SiC composite material as the main component, a kneaded material is prepared by kneading predetermined amounts of C powder, SiC powder, binder, and water or an organic solvent and formed to obtain a honeycomb formed body having a desired shape.

By drying and firing the honeycomb formed body, a honeycomb structure 1 where a plurality of cells 3 functioning as gas passage are separated and formed by the partition walls 4 can be obtained. Subsequently, the temperature of the metal pipe 12 is raised, and the honeycomb structure 1 is inserted into the metal pipe 12 for integration by shrink fitting to form the heat exchanger element 10. Incidentally, for the connection of the honeycomb structure 1 and the metal pipe 12, brazing or diffusion bonding, or the like may be employed besides shrink fitting. By disposing the heat exchanger element 10 in the casing 21, the heat exchanger 30 can be obtained.

EXAMPLE

Hereinbelow, the present invention will be described in more detail on the basis of Examples. However, the present invention is by no means limited to these Examples.

1. Manufacturing of Heat Exchanger (Preparation of Kneaded Material)

With 100 parts by mass of a SiC powder having an average particle diameter of 35 μm, 4 parts by mass of a binder and water were mixed, and they were kneaded with a kneader to obtain a kneaded material. The kneaded material was put in a vacuum kneader to obtain a circular cylindrical kneaded material.

(Extrusion Forming)

Next, the kneaded material was extruded to form a honeycomb formed body. In the extrusion, by selecting a die and a jig having appropriate forms, the shape and thickness of the outer peripheral wall 7 and the thickness of partition walls 4, the shape of the cells 3, the cell density, etc., were made desirable. The die made of superhard alloy which hardly abrades away was employed. Regarding the honeycomb formed body, the outer peripheral wall 7 was formed into a cylindrical shape, and the inside of the outer peripheral wall 7 was formed to have a structure separated into a quadrangular lattice pattern by the partition walls 4. These partition walls 4 were formed to be parallel at regular intervals in each of the directions perpendicular to each other and to straightly pass across the inside of the outer peripheral wall 7. This made square the cross-sectional shape of the cells 3 inside the outer peripheral wall 7 except for the outermost peripheral portion.

(Drying)

Next, the honeycomb formed body obtained by extrusion was dried. In the first place, the honeycomb formed body was dried by an electromagnetic wave heating method and subsequently dried by an external heating method. By the two-step drying, moisture corresponding to 97% or more of the content of the entire moisture contained in the honeycomb formed body before drying was removed from the honeycomb formed body.

(Degreasing, Impregnation of Si Metal, and Firing)

Next, the honeycomb formed body was degreased at 500° C. for five hours in a nitrogen atmosphere. Further, a lump of metal Si was put on the honeycomb structure 1 degreased above, and firing was performed at 1450° C. for four hours in vacuum or pressure-reduced inert gas. During the firing, the lump of metal Si put on the honeycomb structure 1 was melted to impregnate the outer peripheral wall 7 and the partition walls 4 with the metal Si. In the case where the coefficient of heat conductivity of the outer peripheral wall 7 and the partition walls 4 was made 100 W/m·K, 70 parts by mass of the lump of metal Si was used with respect to 100 parts by mass of the honeycomb structure. In the case where the coefficient of heat conductivity of the outer peripheral wall 7 and the partition walls 4 was made 150 W/m·K, 80 parts by mass of the lump of metal Si was used with respect to 100 parts by mass of the honeycomb structure. After such firing, a honeycomb structure 1 was obtained.

(Metal Pipe)

A stainless steel metal pipe was engaged with the outer peripheral face 7h of the honeycomb structure 1 to manufacture a heat exchanger element 10 (see FIG. 1B). A more detail configuration and the like of the heat exchanger element 10 will be described below when each of Examples and Comparative Examples is described individually.

(Casing)

The heat exchanger element 10 was arranged in a stainless steel casing 21 (see FIG. 13).

Examples 1 to 8 and Comparative Examples 1 to 3

FIGS. 14A to 14E are schematic views showing Comparative Example 1, Comparative Example 2, Comparative Example 3, Examples 1 and 3 to 8, and Example 2, respectively (These drawings were simplified and show arrangements of the honeycomb structures 1). In Comparative Example 1, the heat exchanger element 10 was configured by one honeycomb structure 1. Comparative Example 2 has two honeycomb structures 1, and Comparative Example 3 has five honeycomb structures 1 to configure the heat exchanger elements 10, where the honeycomb structures 1 were arranged in close contact with one another with no gap 17 between the honeycomb structures 1. In each of Examples 1 and 2, the heat exchanger element 10 was constituted of five honeycomb structures 1 with a gap 17 between the honeycomb structures 1 (see "gap between honeycomb structures" of Table 1). Cell directions are aligned in Example 1 whereas cell directions are dislocated in Example 2 for the arrangement. In Examples 3 to 8, the honeycomb structures 1 are arranged to have the aligned cell directions with a gap 17 between the honeycomb structures 1 in the same manner as in Example 1. However, the size of the gap 17 is varied.

2. Test (Temperature Efficiency Test)

There was measured the heat-transfer efficiency to the second fluid at the time of passing the first fluid through the cells 3 of the honeycomb structure 1 of the heat conduction member. Nitrogen gas ($N_2$) was used as the first fluid and passed through the first fluid passage portion 5 of the honeycomb structure 1 at a flow rate of 15 g/s at 350° C. As the second fluid, water was used and passed through the second fluid passage portion 6 in the casing 21 at a flow rate of 10 L/min. at 40° C.

(Test Result)

Table 1 shows temperature efficiency. The temperature efficiency (%) was calculated by the formula 1 by calculating each energy amount from the ΔT° C. (outlet port temperature—inlet port temperature of the honeycomb structure 1) of the first fluid (nitrogen gas) and the second fluid (water).

Temperature efficiency (%) (inlet port temperature of the first fluid(gas)–outlet port temperature of the first fluid(gas))/(inlet port temperature of the first fluid(gas)–inlet port temperature of the second fluid(coolant water))    (Formula 1)

(Measurement of Pressure Drop)

In the aforementioned heat exchange test, a pressure gauge was disposed in the nitrogen gas passage located in front and at the back of the heat exchanger element 10. From the differential pressure obtained from the measured values of these pressure gauges, the pressure drop of the nitrogen gas flowing though the heat exchanger element 10 (through the cells 3) was measured.

TABLE 1

| | Honeycomb structure | | Cell | | Gap between honeycomb structures (mm) | Angle of dislocated cell of adjacent honeycomb structures (°) | Temperature efficiency (%) | Pressure drop (kPa) |
|---|---|---|---|---|---|---|---|---|
| | Diameter (mm) | Length (mm) × number | Partition wall thickness (mm) | Cell density (cpsi) | | | | |
| Comp. Ex. 1 | 40 | 100 × 1 | 0.3 | 150 | 0 | — | 55 | 1.2 |
| Comp. Ex. 2 | 40 | 50 × 2 | 0.3 | 150 | 0 | 45 | 60 | 1.2 |
| Comp. Ex. 3 | 40 | 20 × 5 | 0.3 | 150 | 0 | 45 | 65 | 1.2 |
| Example 1 | 40 | 18.4 × 5 | 0.3 | 150 | 2 | 0 | 69 | 0.9 |
| Example 2 | 40 | 18.4 × 5 | 0.3 | 150 | 2 | 45 | 70 | 1.0 |
| Example 3 | 40 | 19.9 × 5 | 0.3 | 150 | 0.1 | 0 | 67 | 1.1 |
| Example 4 | 40 | 19.6 × 5 | 0.3 | 150 | 0.5 | 0 | 69 | 0.9 |
| Example 5 | 40 | 16.0 × 5 | 0.3 | 150 | 5 | 0 | 69 | 0.9 |
| Example 6 | 40 | 15.2 × 5 | 0.3 | 150 | 6 | 0 | 67 | 0.9 |
| Example 7 | 40 | 12.0 × 5 | 0.3 | 150 | 10 | 0 | 67 | 0.8 |
| Example 8 | 40 | 11.2 × 5 | 0.3 | 150 | 11 | 0 | 64 | 0.7 |

Examples 1 to 8, which have a gap 17 between adjacent honeycomb structures 1, had the same entire length as that of the Comparative Example 1 to 3 and each had an improved temperature efficiency in comparison with Comparative Examples 1 to 3 though the first fluid contact area was reduced. Though Example 8 has small temperature efficiency in comparison with Comparative Example 3, it may be said that the temperature efficiency was improved because the length of the honeycomb structure 1 is small. However, it may be said that the effect of improving the temperature efficiency by the gap 17 is reduced by setting the gap 17 to 11 mm (Example 8). Therefore, it was preferable to set the gap 17 to 0.1 to 10 mm. In Example 2, where the cell directions were out of alignment, the temperature efficiency was improved more than Example 1, where the cell directions were aligned. Though the entire length of Examples 1 to 8 was the same as that of Comparative Examples 1 to 3, the pressure drop of Examples 1 to 8 was reduced in comparison with Comparative Examples 1 to 3.

Examples 9 and 10 and Comparative Example 4 and 5

FIGS. 15A to 15D are schematic views showing Comparative Example 4, Example 9, Comparative Example 5, and Example 10, respectively. In each of Comparative Examples 4 and 5, the heat exchanger element 10 was constituted of one honeycomb structure 1. In each of Examples 9 and 10, the heat exchanger element 10 was constituted of three honeycomb structure 1 having different cell densities. The upstream (inlet side) is on the left side of the drawings, and the downstream (outlet side) is on the right side.

TABLE 2

| | Honeycomb structure | | Cell | | Gap between honeycomb structures (mm) | Temperature efficiency (%) | Pressure drop (kPa) |
|---|---|---|---|---|---|---|---|
| | Diameter (mm) | Length (mm) | Partition wall thickness (mm) | Cell density (cpsi) | | | |
| Comp. Ex. 4 | 40 | 100 | 0.4 | 300 | 0 | 85 | 1.6 |
| Example 9 | 40 | Inlet side 28 | 0.4 | 100 | 2 | 90 | 1.4 |
| | | Center 28 | 0.4 | 200 | | | |
| | | Outlet side 40 | 0.4 | 300 | | | |
| Comp. Ex. 5 | 40 | 100 | 0.4 | 500 | 0 | 92 | 2.0 |
| Example 10 | 40 | Inlet side 28 | 0.4 | 100 | 2 | 95 | 1.7 |
| | | Center 28 | 0.4 | 300 | | | |
| | | Outlet side 40 | 0.4 | 500 | | | |

Since Example 9 had an arrangement with a gap 17 between adjacent honeycomb structures 1 and a small cell density on the upstream side in comparison with Comparative Example 4, the temperature efficiency was improved, and the pressure drop was reduced. Since Example 10 had an arrangement with a gap 17 between adjacent honeycomb structures 1 and a small cell density on the upstream side in comparison with Comparative Example 5, the temperature efficiency was improved, and the pressure drop was reduced in spite of the small contact area of the first fluid.

INDUSTRIAL APPLICABILITY

The heat exchanger element of the present invention is not particularly limited as long as the heat exchanger element is used for exchanging heat between a heating body (high temperature side) and a body to be heated (low temperature side) even in an automobile field and an industrial field. In particular, it is suitable in the case where at least one of the heating body and a body to be heated is liquid. In the case where it is used for exhaust heat recovery from exhaust gas in an automobile field, it can be used to improve fuel consumption of an automobile.

DESCRIPTION OF REFERENCE NUMERALS

1: honeycomb structure, 2: end face (in the axial direction), 3: cell, 3a: cell intersection, 4: partition wall, 5:

first fluid passage portion, 6: second fluid passage portion, 7: outer peripheral wall, 7a: extended outer peripheral wall, 7h: outer peripheral face (of honeycomb structure), 8: cell structural portion, 10: heat exchanger element, 11: metal-engaging honeycomb structure, 12: metal pipe, 12a: one side end portion of metal pipe, 12b: the other side end portion of metal pipe, 12f: large diameter portion, 12g: small diameter portion, 12h: outer peripheral face (metal pipe), 12m: convex portion, 12n: concave portion, 12p: notched portion, 12q: unnotched portion, 13: heat resistance reduction layer, 17: gap, 21: casing, 22: inlet port (of the second fluid), 23: outlet port (of the second fluid), 24: inside face (of casing), 30: heat exchanger

The invention claimed is:

1. A heat exchanger element comprising at least two honeycomb structures arranged serially and each including a cell structural portion having cells separated and formed by partition walls containing at least 50% by mass SiC and functioning as passages which extend from one end face to the other end face and which a first fluid passes through, and an outer peripheral wall containing at least 50% by mass SiC disposed on the outer periphery of the cell structural portion;
wherein the first fluid passes through the cells of the honeycomb structures without leaking out of the cells or mixing,
the cell structural portions of at least a pair of the honeycomb structures adjacent to each other among the honeycomb structures arranged serially are disposed with a gap, and the first fluid passing through the cells mixes together between end faces forming the gap,
the first fluid and a second fluid exchange heat via the outer peripheral walls of the honeycomb structures in a state where the first fluid passing through the cells and the second fluid passing outside the outer peripheral walls of the honeycomb structures are not mixed with each other, and
wherein the entirety of one end face of one of the honeycomb structures is spaced from the entirety of one end face of the other one of the honeycomb structures such that all of the cells of one of the honeycomb structures are spaced from all of the cells of the other honeycomb structure, and
wherein the heat exchanger element further comprises one or more metal pipes disposed on the outer periphery of the outer peripheral wall of each honeycomb structure.

2. The heat exchanger element according to claim 1, wherein the gap between the cell structural portions of the adjacent honeycomb structures is 0.1 to 10 mm.

3. The heat exchanger element according to claim 1, wherein at least one of the honeycomb structures connected serially is rotated with a central axis of the honeycomb structure as the center so that the directions of the partition walls of the cells are out of alignment with respect to the other honeycomb structure(s) to allow the first fluid passing through the cells to be mixed together between the end faces forming the gap.

4. The heat exchanger element according to claim 1, wherein a honeycomb structure has a different cell density from the other honeycomb structures among the honeycomb structures connected serially.

5. The heat exchanger element according to claim 1, wherein a honeycomb structure having a higher cell density than that of the honeycomb structure located closest to the inlet of the first fluid is disposed at the second or any subsequent position from the inlet side.

6. The heat exchanger element according to claim 1, wherein the thickness of the partition walls is different between the honeycomb structures on the inlet side and the outlet side of the first fluid.

7. The heat exchanger element according to claim 1, wherein the honeycomb structures connected serially have the same cell structure, and, with respect to the location of a cell intersection of one of the honeycomb structures, a cell intersection of at least another honeycomb structure is out of alignment.

8. The heat exchanger element according to claim 1, wherein the honeycomb structures have an extended outer peripheral wall formed cylindrically by extending from the end faces to the outside in the axial direction, and the honeycomb structures are arranged with the extended outer peripheral walls abutting each other to have a gap between the cell structural portions.

9. The heat exchanger element according to claim 1, comprising metal engagement honeycomb structures each including a metal pipe engaged with the outer peripheral face of the honeycomb structure,
wherein the metal pipe has a connecting means arranged in at least one end portion and capable of connecting the end portion to another metal pipe, and
the metal pipes are connected to one another with the connecting means to arrange the honeycomb structures serially with a gap.

10. The heat exchanger element according to claim 9, wherein a diameter of one end portion of the metal pipe is larger than that of the end portion on the other side in the connecting means, and the metal pipes are connected to one another by inserting the end portion on the other side of another metal pipe into the one end portion for engagement.

11. The heat exchanger element according to claim 9, wherein a diameter of the one end portion of the metal pipe is larger than that of the end portion on the other side in the connecting means, and a convex portion protruding in the diametral direction is formed in one of the end portions whereas a concave portion depressed in the diametral direction is formed in the other end portion opposite to the end portion having the convex portion, so that the convex portion and the concave portion in another metal pipe engage with each other for connection.

12. The heat exchanger element according to claim 9, wherein a notched portion depressed in the axial direction is formed in each of the end portions as the connecting means, and
an unnotched portion, which is not the notched portion, of another metal pipe is engaged with the notched portion for connection.

13. The heat exchanger element according to claim 9, wherein a heat resistance reduction layer made of one of soft metals, alloy materials, and carbon-based materials is arranged between the honeycomb structure and the metal pipe.

14. A method for manufacturing the heat exchanger element according to claim 13,
wherein the metal pipe is engaged with the honeycomb structure by shrink fitting in a state of sandwiching the heat resistance reduction layer therebetween.

15. A heat exchanger comprising:
the heat exchanger element according to claim 1, and
a casing containing the heat exchanger element therein;
wherein the first fluid and the second fluid are allowed to exchange heat via the outer peripheral wall of the honeycomb structure in the state where the first fluid passing through the cells and the second fluid passing outside the outer peripheral wall of the honeycomb structure in the casing are not mixed with each other.

16. The heat exchanger element according to claim 1, wherein a porosity of each honeycomb structure is 20% or less.

* * * * *